United States Patent [19]
Sonoda et al.

[11] Patent Number: 6,115,494
[45] Date of Patent: *Sep. 5, 2000

[54] IMAGE PROCESSING METHOD AND DEVICE AND SCANNER AND PRINTER EQUIPPED WITH SAME

[75] Inventors: Shinya Sonoda; Masahiro Akagi; Kouichi Ohmae; Masahito Yanagida; Masahiro Senga, all of Kyoto, Japan

[73] Assignee: Omron Corporation, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/672,340

[22] Filed: Jun. 28, 1996

[30] Foreign Application Priority Data

Jun. 29, 1995 [JP] Japan ................ P7-185002

[51] Int. Cl.⁷ .......................................... G06K 9/80
[52] U.S. Cl. ..................... 382/165; 382/135; 382/217; 399/366
[58] Field of Search .................... 382/165, 112, 382/135–140, 317–319, 209, 217, 218, 190, 181; 396/366; 356/71; 235/379; 209/534, 576; 73/159; 194/206, 207; 399/366

[56] References Cited

U.S. PATENT DOCUMENTS

| | | | |
|---|---|---|---|
| 4,586,811 | 5/1986 | Kubo et al. | 399/366 |
| 5,216,724 | 6/1993 | Suzuki et al. | 382/135 |
| 5,363,454 | 11/1994 | Udagawa et al. | 382/135 |
| 5,434,649 | 7/1995 | Hasuo et al. | 399/366 |
| 5,481,377 | 1/1996 | Udagawa et al. | 399/366 |
| 5,835,625 | 11/1998 | Fitzpatrick et al. | 382/165 |
| 5,949,903 | 9/1999 | Outa et al. | 382/165 |

FOREIGN PATENT DOCUMENTS

| | | |
|---|---|---|
| 0 522 769 A1 | 1/1993 | European Pat. Off. . |
| 2-210591 | 8/1990 | Japan . |

OTHER PUBLICATIONS

IBM Technical Disclosure Bulletin, "System for Determining Form Alignment", 30:11:57, XP002009484, Apr. 1, 1988.
Patent Abstracts of Japan, Apr. 13, 1992. JP–A–04 001878, 16:147:1336, Jan. 7, 1992.
Research Disclosure, "Registration Marks for Machine Vision", 349:292, XP000377191, May 1, 1993.

*Primary Examiner*—Jon Chang
*Attorney, Agent, or Firm*—Dickstein Shapiro; Morin & Oshinsky, LLP

[57] ABSTRACT

A method and apparatus to detect marks of a specified shape and color on a document and to extract a specified pattern consisting of a number of these marks. An RGB color signal is sent, color by color, by way of image input unit 12 to binary processing unit 13. If the marks are yellow, the B signal for the pixels constituting the marks will be smaller than the other signals. The B signal is sent to mark shape extraction unit 13a and threshold processing is executed. Simultaneously, R, G and B are sent to mark color extraction unit 13b, and the fact that the marks are yellow is detected. AND element 13c finds the logical product of these processes, and a binary image is generated from which only the yellow pixels have been extracted. This binary image is transmitted to mark location detection unit 15 by way of storage unit 14. The shapes of the marks are matched against reference data and location data are extracted for the marks. The location data are transmitted to pattern location matching unit 17 by way of storage unit 16. The goodness of fit representing whether the marks are in specified locations is obtained and output.

20 Claims, 33 Drawing Sheets

WHEN YELLOW MARKS ARE USED

WHEN CYAN MARKS ARE USED

WHEN MAGENTA MARKS ARE USED

WHEN BLUE MARKS ARE USED

WHEN GREEN MARKS ARE USED

WHEN RED MARKS ARE USED

FIG. 24

| AWQ 00 | AWQ 01 | AWQ 02 | AWQ 03 | AWQ 04 | AWQ 05 | AWQ 06 | AWQ 07 | AWQ 08 | AWQ 09 |
|---|---|---|---|---|---|---|---|---|---|
| AWQ 20 | 21 | 22 | 23 | 24 | 25 | 26 | 27 | 28 | 29 |
| AWQ 30 | 31 | 32 | 33 | 34 | 35 | 36 | 37 | 38 | 39 |
| AWQ 40 | 41 | 42 | 43 | 44 | 45 | 46 | 47 | 48 | 49 |
| AWQ 50 | 51 | 52 | 53 | 54 | 55 | 56 | 57 | 58 | 59 |
| AWQ 60 | 61 | 62 | 63 | 64 | 65 | 66 | 67 | 68 | 69 |
| AWQ 70 | 71 | 72 | 73 | 74 | 75 | 76 | 77 | 78 | 79 |
| AWQ 80 | 81 | 82 | 83 | 84 | 85 | 86 | 87 | 88 | 89 |
| AWQ 90 | 91 | 92 | 93 | 94 | 95 | 96 | 97 | 98 | 99 |

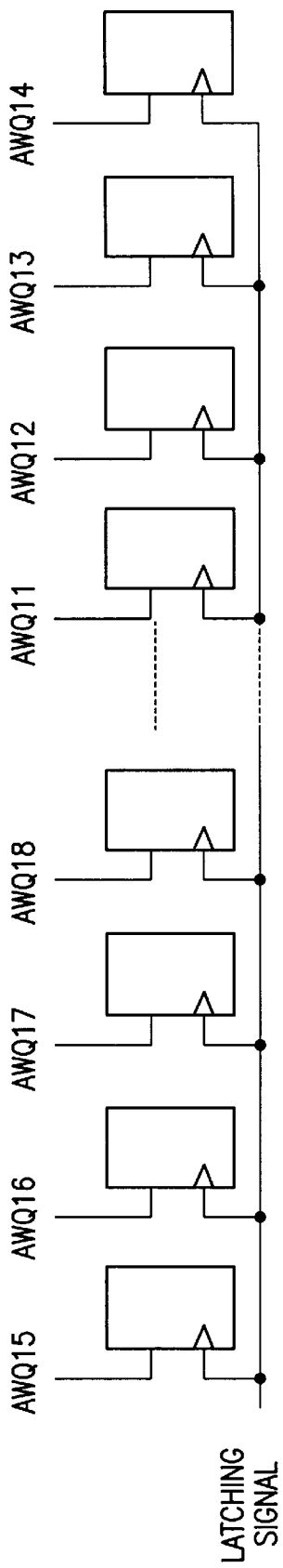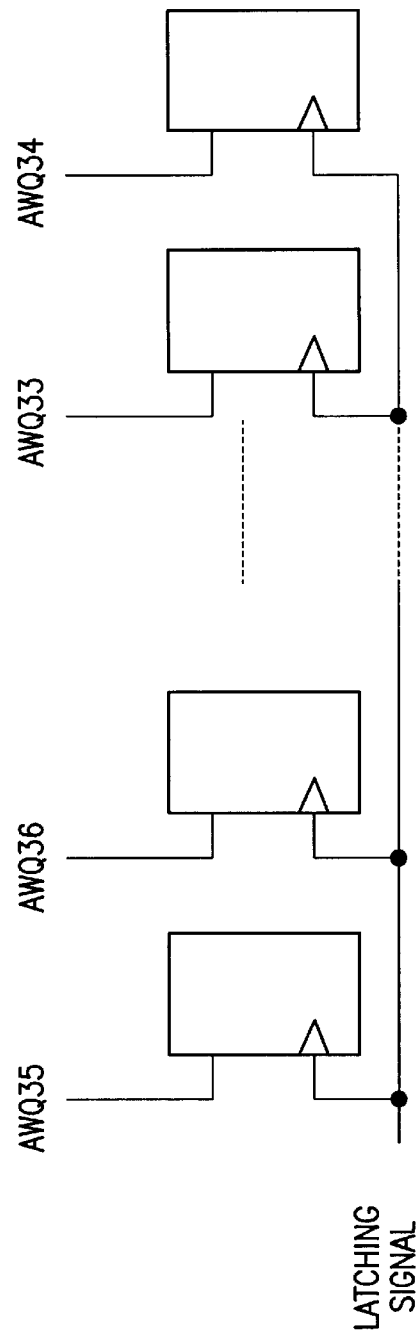
FIG. 25
FIG. 26

FIG. 27A  0°
AWQ35   AWQ15
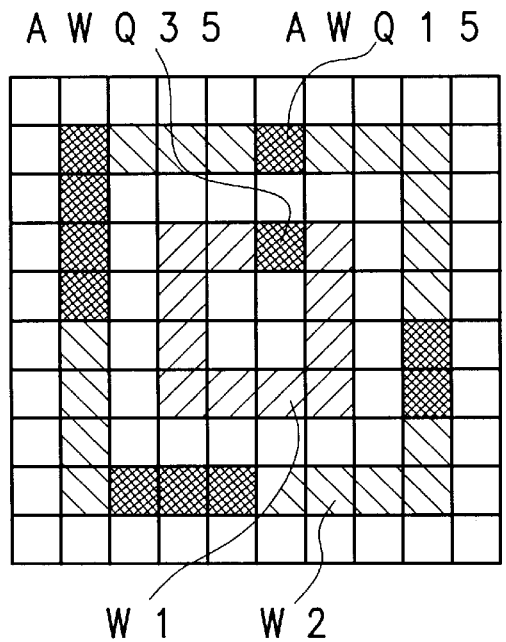
W1   W2
FIG. 27B  90°
AWQ15
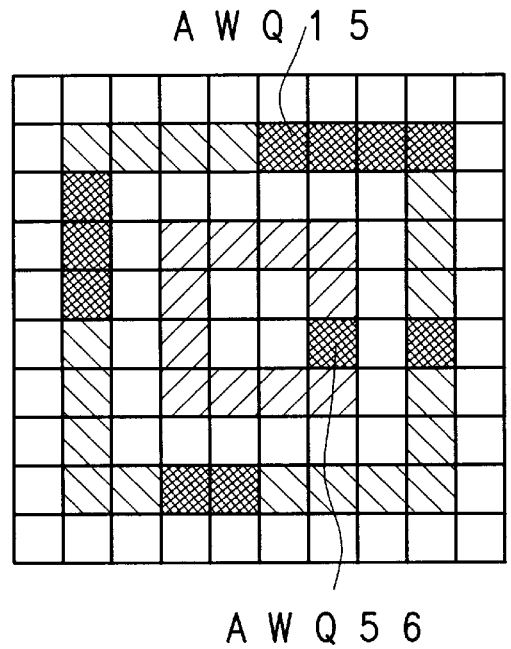
AWQ56
FIG. 27C  180°
AWQ15
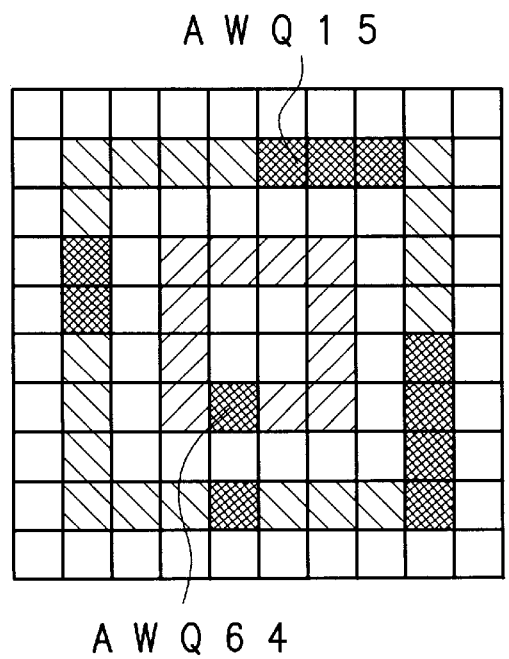
AWQ64
FIG. 27D  270°
AWQ43   AWQ15
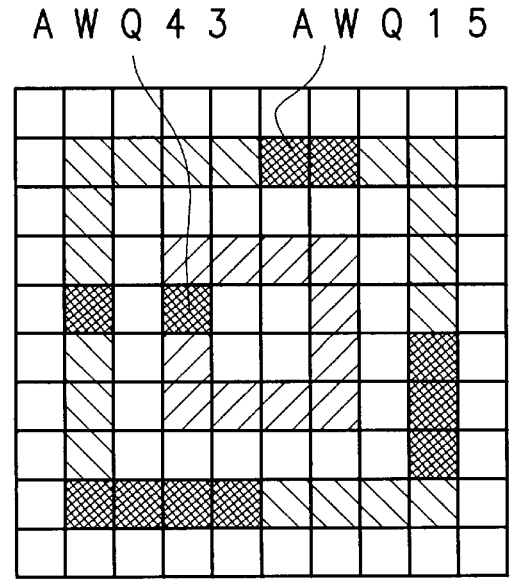

FIG. 28

DATA FOR INNER SQUARE W₁

0°: 1000000000000
90°: 0001000000000
180°: 0000000100000
270°: 0000000000100

DATA FOR OUTER SQUARE W₂

0°: 10000011000001110000011110 00
90°: 11110000100000110000011100 00
180°: 11110000011110000110000011 00 00
270°: 11000001111000000110000010 00 00

ADDRESS UNIT

DATA UNIT

R DENSITY

G DENSITY

B DENSITY

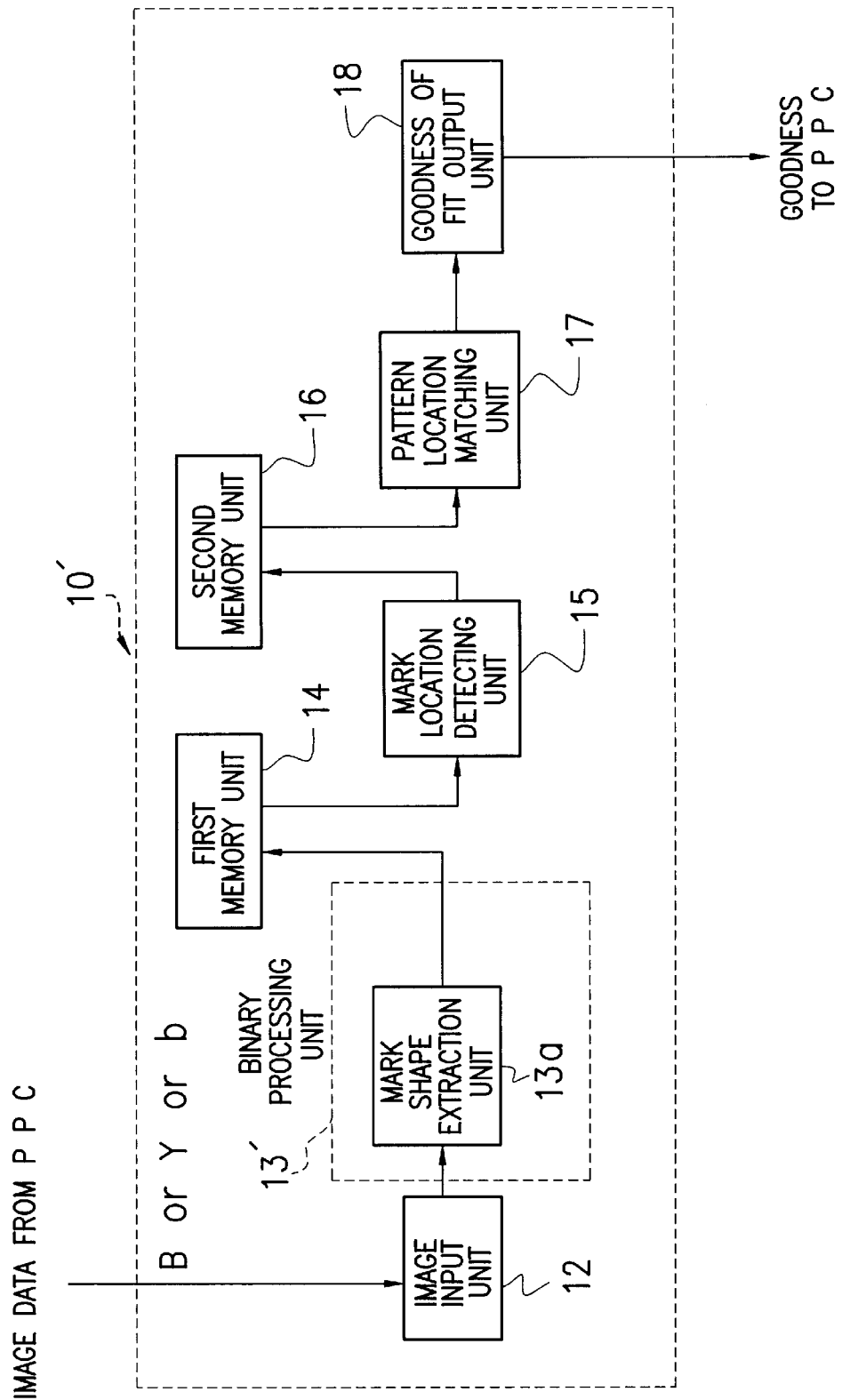

IMAGE PROCESSING METHOD AND DEVICE AND SCANNER AND PRINTER EQUIPPED WITH SAME

FIELD OF THE INVENTION

This invention concerns an image processing method and device optimally suited to prevent the read-out or printing of documents which may not legally be copied, such as bank notes, negotiable securities or top secret documents, as well as a copier, scanner or printer in which it is installed.

BACKGROUND OF THE INVENTION

The development in recent years of copying devices such as full-color copiers has enhanced the quality of reproduction to a level at which one cannot distinguish the copy from the original with the naked eye. Such faithful reproductions can now be obtained inexpensively. However, along with this benefit comes the increased risk of copiers being put to such illicit uses as counterfeiting money, negotiable securities, and other original documents whose reproduction is legally prohibited, or the purloining of top secret documents by copying them. To avert this danger, various devices have been developed to prevent copiers from being used for counterfeiting. One such device is the image processing device disclosed in Japanese Patent Publication 2-210591.

That image processing device is installed in a full-color digital copy machine which reads the original image placed on the glass of the copier by scanning the entire original four times and executes the processing needed to copy it. Let us assume a bank note has been placed on the glass of the copy machine. On the first scan, the device detects the rough location of watermark B, the mark on bank note A which identifies it as money (see FIG. 37), the item which the machine is to be prevented from copying, on the assumption that the document on the glass is, in fact, a bank note.

On the second scan, the device uses the location of watermark B to detect the exact position of the bill and the angle at which it is placed (i.e., the exact position coordinates of the bill on the glass). Because the length, size and shape of bank note A, the item to be detected, are already known, we can extract the edge C (the hatched portion) of bank note A by binarizing the image data at a given threshold. Using this edge, we can obtain the coordinates $(x_1, y_1)$ and $(x_2, Y_2)$ of two apices D.

In this way we can obtain the slope theta at which the bill is oriented. On the third scan, we use the exact position of the bill (the coordinates of apices D and angle theta) obtained in the second scan to calculate the position coordinates $(x_3, y_3)$ of the red seal E stamped on the bill. Based on these position coordinates, we extract an image from the region in which the seal is placed, and we make a judgment as to whether there is in fact a red seal on this item.

By scanning the item three times, the device is able to determine whether or not a document which it is supposed to detect (in this case, a bank note) is loaded in the copier. If the device detects that a prohibited document such as a bank note has been loaded to be copied, it will perform its specified anti-counterfeiting operations on the fourth scan, such as making the entire display go black or preventing the copier from operating.

The existing device described above requires an extremely large memory capacity merely to store data concerning the size of paper money. Inevitably, then, only a limited number of kinds of money can be detected.

Furthermore, three scans are needed to determine whether the item on the glass is a non-reproducible document such as a bank note. If the apices D of bank note A are folded down or mutilated in some other way, the device will be unable to determine the location of red seal E, and consequently will be unable to detect that the item being processed is a bank note, one of the items it is supposed to detect.

One solution to this problem would be to surround specified pattern E with a guideline F consisting of either a heavy continuous line or a broken line, as shown in FIGS. 38 (A) and (B). The region inside guideline F could then be extracted to determine if it contains the specified pattern. If the type of guideline F shown in the drawing is used, then, it will be easier to separate the region containing the specified pattern from the other image data. The straight portions of guideline F can be used to calculate the slope and angle of orientation of the bill as well as the coordinates of the apices. The use of a guideline thus allows us to extract the specified pattern more easily and accurately.

When this method is used, however, guideline F is conspicuous on the bill (because it is a large feature). It can easily be seen and recognized, as can the specified pattern E which it encloses. This makes it easier for someone to tamper with guideline F or specified pattern E (by adding extra lines or erasing portions of lines). If the pattern or guideline has been tampered with, it is possible that the pattern will not be recognized (or extracted), or that even if it is recognized it will not be determined to be the right pattern.

Another problem is that at least two scans are required to detect the location of bank note A and guideline F, find the location of the specified pattern, extract the pattern and determine whether it is the right pattern. The device could not then be used in copy machines which read the image in a single scan. If we wish to extract the specified pattern without any preliminary scans, our only recourse is to match the pattern against a reference as each pixel is read in the raster direction. Since we do not know the orientation of the pattern (i.e., the angle at which the image is oriented on the glass), we must also consider the angle of rotation when we match the pattern. This makes our task extremely difficult.

The existing method or the method using guideline F required selecting from the many patterns on a non-reproducible document a pattern suitable for feature analysis (i.e., one which can be discriminated accurately and which is not found on any document which may be legally copied), such as the red seal on a bank note, and matching it against a reference pattern. Even if we limit our focus to Japan, there are many, many documents which may not legally be copied. To detect all of them reliably would require a huge memory capacity and lengthy processing. Existing devices, then, lack the capacity to execute the required processing in real time. Furthermore, such devices require three scans to determine that the document may not be copied. This too stands in the way of high-speed processing.

If, after the copier is manufactured, a new document appears which may not be copied, the device will not be able to handle the document or even detect it. To detect the document, a new set of features must be selected and taught to the copier, which is a complicated procedure. If we are to include the documents of other countries, the problem becomes even more overwhelming.

SUMMARY OF THE INVENTION

The objective of this invention is to provide an image processing method and device which solves these various problems as well as a copier, scanner and printer in which they are employed. More specifically, if there are marks or a specified pattern composed of marks on a document, this method and device would be able to execute the specified processing (actually determining whether this is the right pattern, extracting the data needed for the determination, and so on) required to detect this pattern unmistakably and evaluate it easily and reliably.

Another objective of this invention is to provide a method and device such that the specified pattern would be difficult for an uninformed person to discern, so as to minimize the probability of tampering, as well as a copy machine or other device in which that method and device are employed.

Yet another objective is to provide a method and device which would be able to recognize the specified pattern on the first scan, which would be able to recognize shapes using a minimal hardware configuration and a simple algorithm, and which would be capable of high-speed processing, as well as a copy machine or other device in which that method and device are employed.

To achieve the objectives outlined above, the image processing method of this invention is designed as follows. With this method, the image is processed to detect in the received image data a number of marks of a given color or shape. The aforesaid marks are detected (by threshold processing, in the embodiment) using only one of the color component signals constituting the color image. If the aforesaid color component signals are received successively, color by color, in the order in which they appear in the image, it is desirable that the color component signal which will be used to detect the aforesaid marks should be received first and processed in specified fashion.

The aforesaid marks may be detected using data obtained by performing threshold processing on the single color component signal mentioned above as well as data obtained by extracting all pixel data for color component signals different from the aforesaid color component signal whose density is within a given range. When the marks are detected using the method in above, the density data for the region where the marks are found may be extracted and the goodness of fit of these data may be obtained with respect to a previously established set of color data. The goodness of fit of these data with respect to the color data and their goodness of fit with respect to a specified pattern defined by the aforesaid shape may be output either separately or in combination. The given color of the pixels constituting the aforesaid marks may be yellow.

In an image processing method such that a number of marks of a given color and shape are detected in received image data and the spatial relationship of these marks is then used to find their goodness of fit with respect to a specified pattern, the aforesaid marks may be detected using one of the methods described in above. In such a case, the aforesaid marks may be located on the peripheries of a number of given shapes (squares, in the embodiment). When the goodness of fit of the marks with respect to the aforesaid specified pattern is obtained, the angle of orientation of the aforesaid specified pattern may be obtained based on data representing the marks on the periphery of one of the aforesaid shapes (in the embodiment, one of the two squares). This angle may then be used to extract for reference purposes the data representing the marks on the peripheries of the other shapes, and these reference data may be compared with previously collected data.

A device ideally suited to implementing any of the methods described above would be an image processing device capable of detecting a number of specified marks in received image data. This device has the following components: a binary processing device which is equipped, at the very least, with a shape extraction unit to execute threshold processing on one of the color component signals comprising a color image; a storage device to store the binary image output by the binary processing device; and a device to detect the location of the marks, which reads out the binary image stored in the storage device and matches the marks in it against the pattern which is to be detected.

The aforesaid binary processing device should ideally have the following: a shape extraction unit; a color extraction unit which extracts, at minimum, all pixel data representing signals for component colors other than the aforesaid component color whose density is within a given range; and an AND element which receives the output of the aforesaid shape extraction and color extraction units.

This image processing device should also have a device placed parallel to the aforesaid binary processing device to store the aforesaid received image data, and a device which receives the output of the aforesaid device to extract the locations of the marks and extracts from the density data associated with the color component signals for the portion of the image where the marks are detected the goodness of fit of the color (in the embodiment, extraction device 20, averaging unit 21 and matching unit 22).

The image processing device should also have a device to store data representing the locations of the marks detected by the aforesaid device for that purpose; and a device which uses the location data stored in the aforesaid device to match these marks against a specified pattern consisting of a number of marks.

The copy machine, scanner or printer of this invention is equipped with any one of the image processing devices described above. The image data output by the aforesaid device which reads the document loaded in the copy machine are input in parallel into both the device to convert the color signals and the aforesaid image processing device. Input and output signals to the control device in the scanner or printer are input in parallel to the image processing device.

The image processing device executes the processing required to detect the aforesaid marks or specified pattern using image data obtained during the specified scan. It decides whether the aforesaid marks or specified pattern appear on the document being processed. If it determines that they do, it transmits a control signal to the aforesaid processing device and controls the specified processing, whether copying, reading the image, or output (i.e., printout).

To detect (or recognize the shape of) a number of marks of a given color and shape, threshold processing is executed for a single specified color. Choosing an appropriate color causes the signals for that color to have a high density among the color component signals (RGB, YMC, Yab, . . . ) of which the color image is constructed. If yellow is chosen, for example, the density of the B, Y and b component signals will get higher (their numerical values will get smaller), and a large difference will be expressed between their values and the values of the background color (the B, Y and b signals) surrounding the marks. By executing threshold processing on a given signal, then, we can separate the marks from the background; and based on this, we can recognize the pattern.

When the signals are transmitted color by color in the order of how much surface they occupy in the image, and the color component signal used to recognize the pattern is the first one transmitted, the determination of whether there are any marks can be made before the transmission of the other color component signals is completed (i.e., before the image is completed). If there are marks, the processing can be halted at this time.

While the marks are being extracted, a judgment is made in parallel with the extraction based on a single color component signal discussed above as to whether the density of the remaining color component signals is within a given range. By finding the logical product of the two processes, we can generate a binary image which can be used to finally extract the marks. This is helpful because when a single color component signal is used, it is possible that pixels of that color outside the marks will also be extracted in the extraction processing. However, even if this happens, the probability that the marks will not be recognized is extremely small, since the spurious pixels will be removed in the final pattern recognition process. When a binary image is generated, pixels which are not part of the marks will go to "0", so the marks can be extracted with greater accuracy.

When the image processing device is configured as described in this invention, the goodness of fit of the color of the marks is extracted using only the density data, and this is done in parallel with the extraction of the pattern. Extracting the goodness of fit of the color does not entail any other judgments, so using this method has the effect of reducing the aggregate processing time. If marks are detected, the density of the region containing the marks is obtained and matched against previously assembled color data. Using both the goodness of fit of the pattern and that of the color to make a judgment significantly reduces the probability that the marks (and so the specified pattern that they form) will not be detected when either the pattern or color has been tampered with.

When yellow is used as the constituent color of the marks, the density of at least one color component signal will be high no matter whether the signals are BRG, YMC, Yab or some other system. Using yellow thus allows the device to be used in equipment with various image formats. Yellow is also a color which is difficult for the human eye to discriminate, so the marks will be difficult to find, which makes it harder to tamper with them.

According to the invention disclosed in this invention, the pattern to be detected is composed of a number of marks which are arranged according to a previously established rule (viz., along the contour of a given shape). When the marks are extracted using any of the various methods and methods described above, a judgment can be made as to whether the marks along the contour of the aforesaid shape are arranged in a given way. In this way we can obtain the goodness of fit of the marks with respect to the specified pattern. If the goodness of fit is high, we can conclude that the marks do constitute the specified pattern, and specified processing can be executed to halt the copying, read-out or output operation. This processing may include causing related processing to cease or executing a given process on the original image, such as printing out a black screen. This is true for the following discussion as well. Since we know that the marks are arranged along the contour of a given shape, we can use a window appropriate for that shape to search for the marks when we need to determine whether they are arranged in a given way. This will make it easier to detect the marks.

With the device described in the embodiment, the specified pattern is composed of a number of marks arranged along the contours of a number of shapes. The locations of the marks on the contour of at least one of the shapes are detected. If there are no marks along the outlines of the other shapes, we can determine that this is not the specified pattern. If the marks are in a given spatial relationship, there is a high probability that this is the specified pattern. Using the absolute coordinates of the marks to detect this relationship allows us to determine the orientation (i.e., the angle of rotation) of the pattern. The locations where the marks along the other shapes should be found at that angle of rotation can be used as reference data. By comparing the actual location data we obtain with these hypothetical location data, we can easily obtain the goodness of fit of the marks to the pattern.

When a copy machine equipped with the image processing device of this invention is used to try to copy a bank note or other non-reproducible document, or when a scanner or printer equipped with this device is used to try to read or print out such a document, the specified pattern on the document can be detected. A command can be issued to halt the copying operation, and the reproduction, read-out or print-out of facsimiles of the document can be prevented.

BRIEF DESCRIPTION OF THE DRAWINGS

FIG. 24 illustrates the principle underlying the organization of the output of the window element.

FIG. 25 shows an example of the data latching circuit used to compare the marks on the outer squares. This circuit is a component of the arrangement matching unit.

FIG. 26 shows an example of the data latching circuit used to compare the marks on the inner squares. This circuit is a component of the arrangement matching unit.

FIGS. 27(A)–27(D) show examples of outputs of the pattern window.

FIG. 28 shows data and addresses stored in storage unit 17, the memory for the outer square.

FIG. 32 shows the overall configuration of the third ideal embodiment of the image processing device of this invention.

DETAILED DESCRIPTION OF THE INVENTION

In this section we shall provide, with reference to the appended drawings, a detailed explanation of ideal embodiments of the image processing method and device of this invention as well as the copier, scanner or printer in which they are employed. We shall begin by using FIGS. 1 through 4 to explain an ideal embodiment of the image processing method of this invention.

Figure 1:
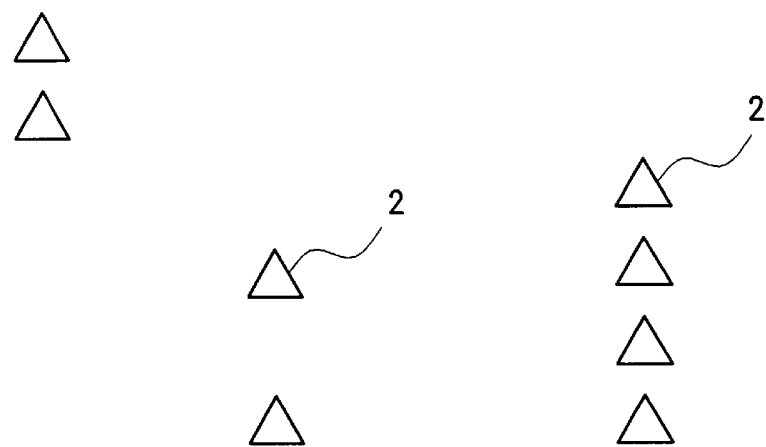
FIG. 1 shows an example of marks and a pattern which might be used in this invention.

In this first embodiment, a pattern such as that shown in FIG. 1 is provided in a given location on the document to be detected, which is something that may not legally be copied. A determination is made as to whether pattern 1 can be found in image data which are captured and transmitted. If it can, a signal representing detection is output.

Figure 2:
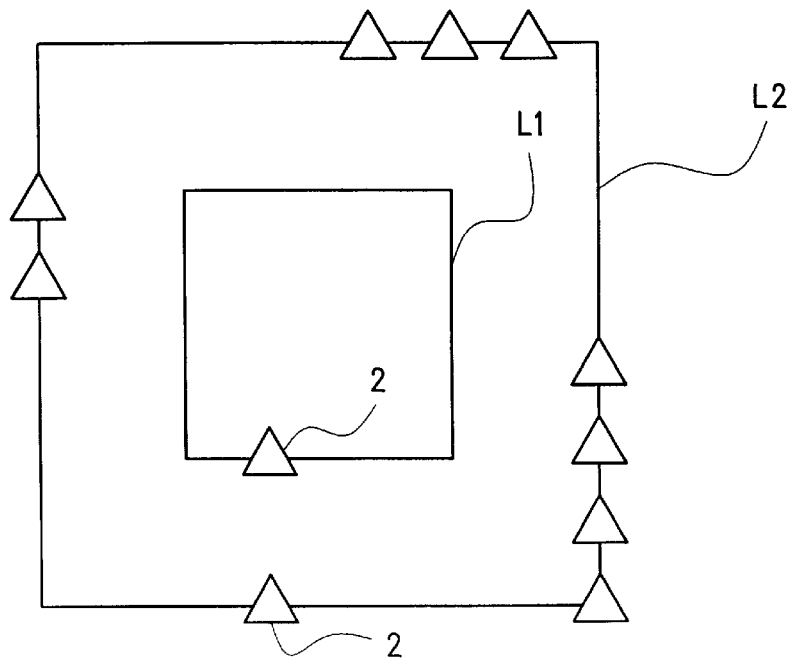
FIG. 2 illustrates the principle by which the marks used in this invention are arranged.

Pattern 1 is composed of a number of marks 2 which are placed in appropriate locations. In this embodiment, marks 2 are small triangles which form the shape of a frame with nothing in the center. These triangles are of a specified color. The principle underlying the arrangement of marks 2 in this example is shown in FIG. 2. The marks are placed along the sides of two squares. In the example shown, there is a single mark 2 in a specified location on $L_1$, the line defining the inner square, and ten marks 2 in specified locations on $L_2$, the line defining the outer square. When marks 2 are placed along the sides of squares (or rectangles) in this way, pattern 1 can be printed so that the sides of the square are parallel to the horizontal and vertical axes of the image. The marks will then correspond to the scanning path when the image is read, which will simplify the detection hardware by allowing a smaller window to be used. When pattern 1 is actually printed, of course, lines $L_1$ and $L_2$ will not be there, and only the marks 2 shown in FIG. 1 will be visible. This will make it difficult for an uninformed person to figure out the principle of the arrangement and so make it more difficult to tamper with the pattern.

If the coordinate position of each mark 2 is specified, the marks can be made quite small (in comparison with the guidelines used in the prior art). This will make it difficult for an uninformed person to find the marks but will not affect the recognition rate. Using smaller marks also allows us to use a smaller window to detect the marks. A simpler and cheaper circuit can be used to detect the marks, and the processing speed can be increased.

According to this invention, all of marks 2 are formed using a given color, as discussed above. The marks may be of identical or similar colors. The color is one with a high density in one of the three color component signals expressing the color data in an RGB or other format.

With this embodiment of the image processing method, a pattern 1 with the characteristics set out above is provided in a given location in the image we wish to detect. When an image is read and output, the image data are scanned and the resemblance of any part of that image to pattern 1 is obtained. If the aforesaid marks are added to the image before a new bank note is issued so that marks 2 and pattern 1 can be detected, this system, despite its small memory, will be able to detect any type of bank note or other non-reproducible document.

In this embodiment, pattern 1 is composed of a number of marks 2. The first step is to detect these marks 2 in the image and determine their locations. The density of one of the three color component signals constituting the marks will be higher than that of the other two. By executing threshold processing in the image signals with respect to this color component signal and binarizing the image data, we can extract marks 2 and recognize the pattern.

In this embodiment, we can achieve greater accuracy by extracting the pixels constituting marks 2. In addition to pattern recognition based on a single color component signal, we can determine whether each pixel in the mark has a given color density. When a single color component signal is subjected to threshold processing independently of the other signals, it is possible for another color (i.e., a color different from the color of the marks) with a density above the threshold to be extracted as well. For this reason, the image data obtained are filtered with respect to the density of the three color component signals. By extracting pixels whose density is within a given range, we can extract only pixels of the desired color.

We can execute pattern recognition using a single color component signal and then determine whether the pattern is the specified color. By finding the logical product of these two processes, we can accurately extract just the pixels constituting the marks. We then determine whether marks of a given shape are found in the binary image composed of the pixels extracted in this way. This concludes the detection process.

We next obtain the locations of the marks we have extracted. By determining whether they are in a given spatial relationship with each other, we can find how closely they resemble the specified pattern (i.e., their goodness of fit). Since the marks 2 which constitute pattern 1 in the example shown in FIG. 2 are placed on the outlines of two squares, two windows can be set up which correspond to these squares. We could then determine whether, for example, the marks 2 found in these windows while scanning in the raster direction are in a given spatial relationship with each other.

Figure 3:
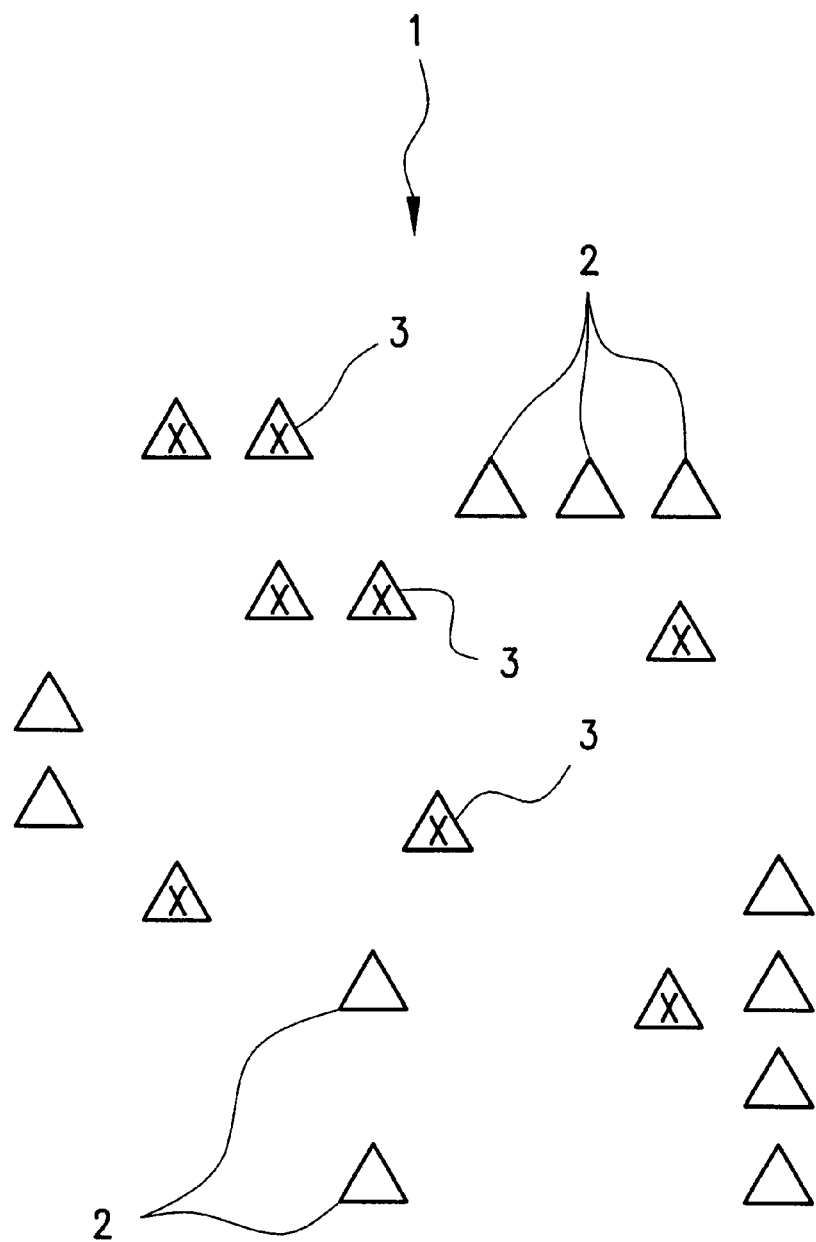
FIG. 3 shows an example of real and dummy marks and a pattern which might be used in this invention.
Figure 4:
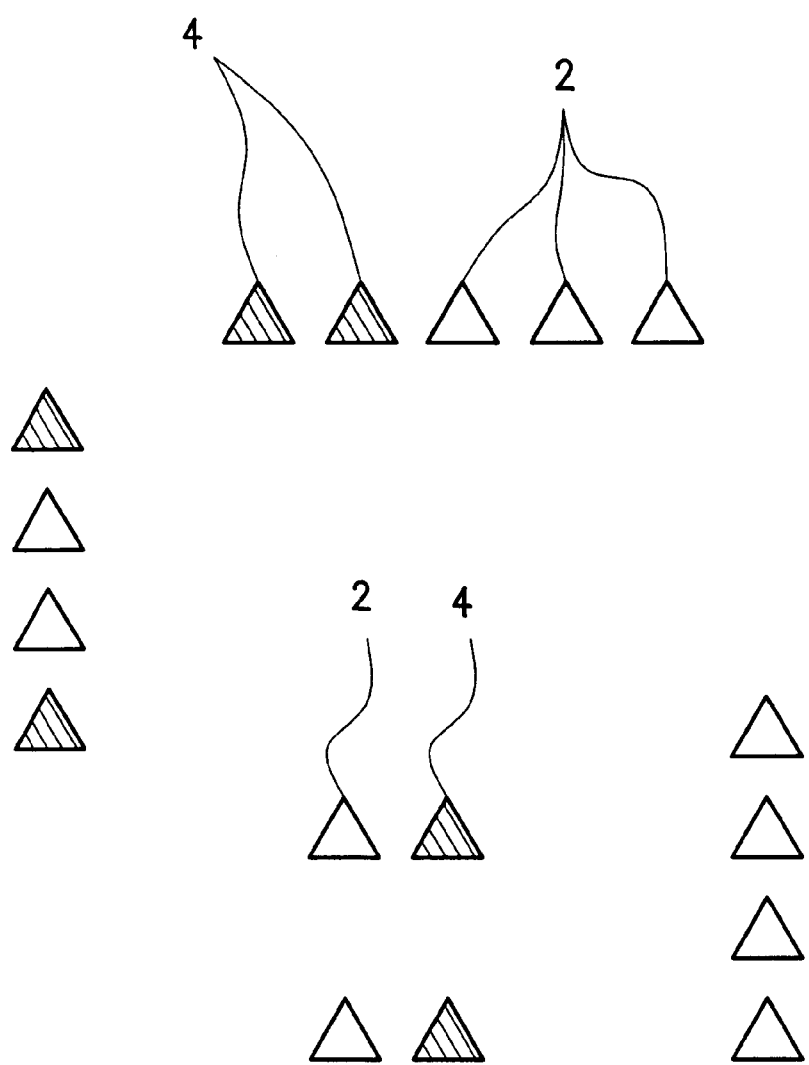
FIG. 4 shows another example of real and dummy marks and a pattern which might be used in this invention.

If, in addition to pattern 1, dummy marks are printed in appropriate places as shown in FIGS. 3 and 4, it will be more difficult to tamper with the pattern. In FIG. 3, dummy marks 3 of the same shape and color as marks 2 (marked with an X in the drawing) have been placed in locations not on the outlines of the two squares discussed above. Dummy marks 3 will be extracted as candidates for pattern 1 in the first detection process described above; but they will be eliminated by the next process, the spatial relationship test using the two windows. The dummy marks will not produce false positives.

An uninformed person will have no way of knowing which of the marks are the actual marks 2 constituting pattern 1, which are essential for pattern recognition, and which are the dummy marks 3. (In FIG. 3, the dummy marks have been identified with an X for convenience; in an actual situation, they would be of the same shape and color as marks 2, and would not be marked with an X.) This would make it very difficult for someone to tamper with the actual marks 2 only.

In the example in FIG. 4, dummy marks 4 of the same shape as marks 2 (indicated by hatching in the drawing) have been placed on the outlines of the aforesaid squares. These dummy marks are of a different color from the actual marks 2. In the first-stage detection process in the processing method we have been discussing, the dummy marks will be eliminated when the data are binarized and/or when the pixels of a given color are extracted for pattern recognition, and they will not be extracted. They will not be erroneously recognized even though they are placed on the outlines of the squares.

Since in this example marks 2 and 4 differ only in their color, an uninformed person will have no way of knowing which of the marks are the actual marks 2 constituting pattern 1, which are essential for pattern recognition, and which are the dummy marks 4. This would make it very difficult for someone to tamper with the actual marks 2 only.

Although this alternative is not pictured in the drawings, the same result can be achieved by placing triangles of different dimensions from marks 2 or dummy marks of other shapes around marks 2. By using an appropriate combination of different types of dummy marks, we can increase their effectiveness.

Any color which meets the conditions set out above (i.e., its density in a given color component signal must be high) may be used for the aforesaid marks. However, yellow, cyan and magenta are good choices, as their density will become higher (i.e., the numerical value of the signal will be smaller) in a single color component signal in the position of an RGB signal. If yellow is used for the marks, its density in a given signal (a B, Y, b signal) will increase regardless of whether the signal format is RGB, Lab or YMC. The pattern will be recognized accurately, but will be relatively difficult to discriminate with the naked eye. Even the fact that marks are there will not necessarily be noticed.

In the method used in the first embodiment as described above, when the marks are extracted and when the mark is extracted using a single color component signal, the image is binarized using either the other color component signals or all of the color component signals. The mark is extracted, the locations of the marks are obtained using these data, and the goodness of fit is obtained. However, the invention is not limited to this method only. It would also be possible, in addition to finding the goodness of fit of the mark, to focus separately on the density of each color component signal. The density of the portions with the marks could be compared with previously assembled reference data to find the goodness of fit of the color, and the goodnesses of fit of the mark and the color can be combined to determine whether the specified pattern has been found. (This is the method used in the second embodiment.) The goodness of fit of the pattern can also be found using only the binary data obtained by extracting the mark based on a single color component signal. (This is the method used in the third embodiment.)

Figure 5:
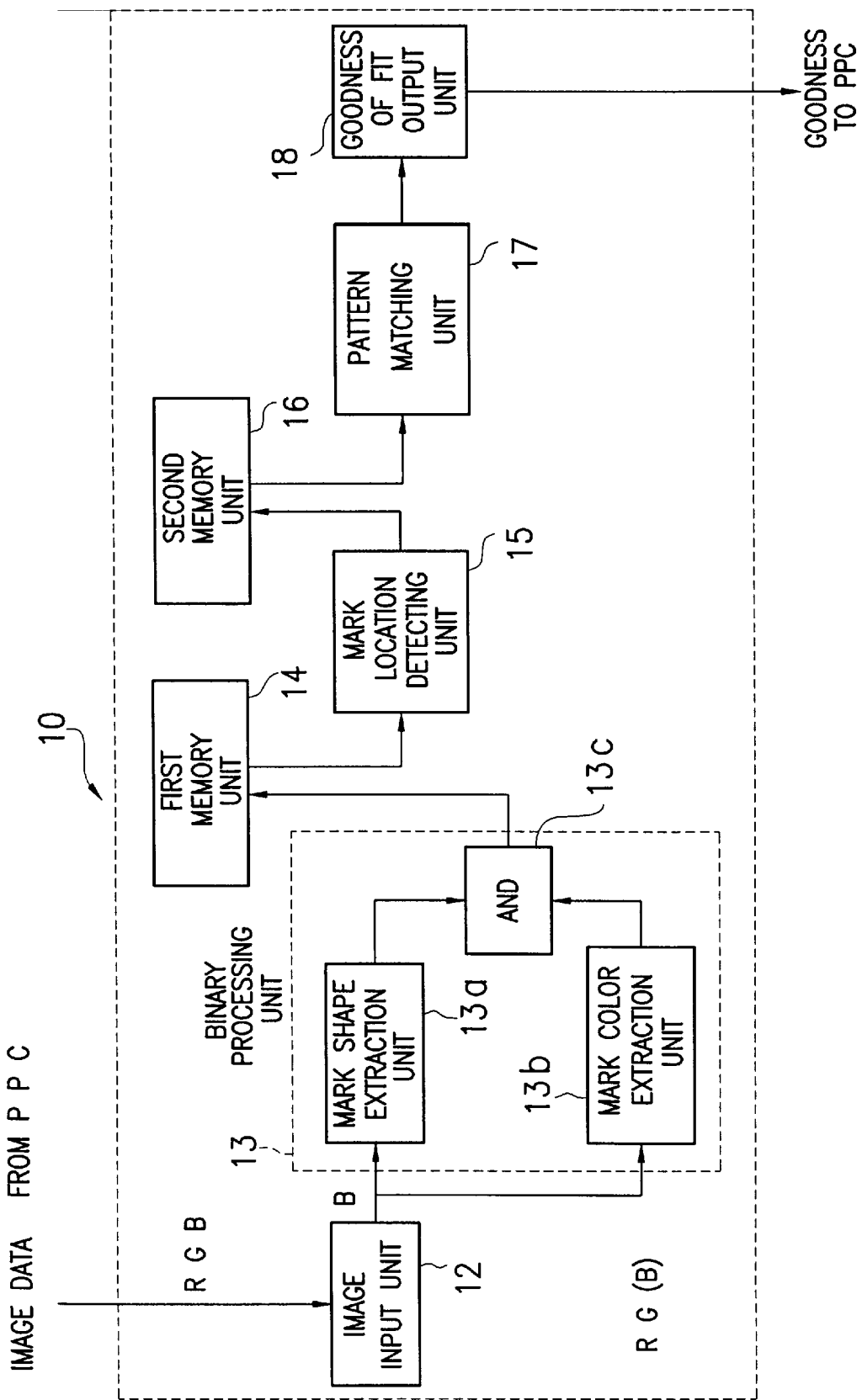
FIG. 5 shows the overall configuration of the first ideal embodiment of the image processing device of this invention.

We shall next discuss an embodiment of the image processing device of this invention which is ideally suited for implementing the processing method described above. FIG. 5 shows the overall configuration of such an image processing device. In this example, the device is installed in a full-color copy machine. When someone uses the copy machine to try to copy a non-reproducible document such as a bank note, the image processing device detects this and interrupts the copying process. As can be seen in the drawing, the image data read by the image sensor in the copy machine are transmitted to image input unit 12 (a buffer IC) in image processing device 10. As these image data are scanned by an image sensor such as a CCD, they are transmitted successively in real time, region by region, to the image processing device. The actual data which are sent are 8-bit color data for each of the red (R), green (G) and blue (B) components.

The RGB color signals pass through image input unit 12 and are transmitted to binary processing unit 13. The binarized image data (i.e., a binary image) are stored in storage device 14. The binary image stored in device 14 is sent to mark location detection unit 15. The marks 2 constituting pattern 1 are extracted from the binary image, their locations are specified, and they are stored in storage device 16. Everything before device 16 constitutes the aforesaid unit to detect the marks.

The data representing the locations of marks 2 which are stored in device 16 are transmitted to pattern location matching unit 17. A window of a specified shape and size is used to determine how well the locations of the marks match a specified arrangement (i.e., the arrangement constituting pattern 1 (see FIG. 1)). The result of this determination is transmitted to goodness output unit 18. If the goodness of fit received by goodness output unit 18 exceeds a given value, a signal indicating that the pattern has been detected is output to the copy machine.

We shall next discuss the function and configuration of each component of the device. Binary processing unit 13 consists of mark shape extraction unit 13a, mark color extraction unit 13b and AND element 13c, which finds the logical product of the outputs of units 13a and 13b. A single color component signal with a high density, whichever of the RGB signals is best suited to extracting the mark, is sent to mark shape extraction unit 13a. The other color component signals, or, alternatively, all the color component signals, are sent to mark color extraction unit 13b. The marks we detected in this example are yellow, so the B signals are sent to mark shape extraction unit 13a.

Figure 6:
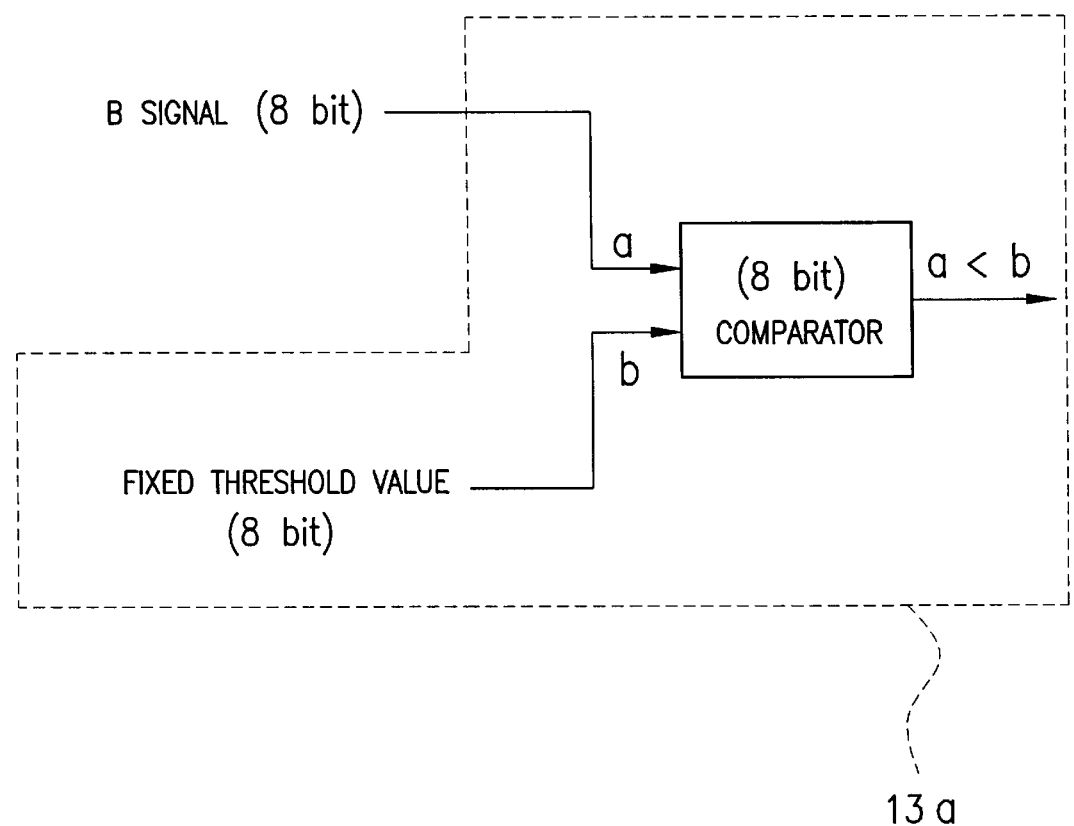
FIG. 6 shows the internal configuration of the shape extraction unit.

Mark shape extraction unit 13a, shown in FIG. 6, executes threshold processing. It has a comparator with eight bits to match the eight bits constituting the color component signals. The B signal received from image input unit 12 is input into input terminal a; a fixed threshold value is input into input terminal b. When a is less than b, the output will be "1". (The higher the density, the lower the numerical value.) In this embodiment, the threshold value is fixed. The use of a floating binary circuit would allow the threshold value to be changed according to the density of the document. Such a configuration would yield a more accurate pattern.

Figure 7:
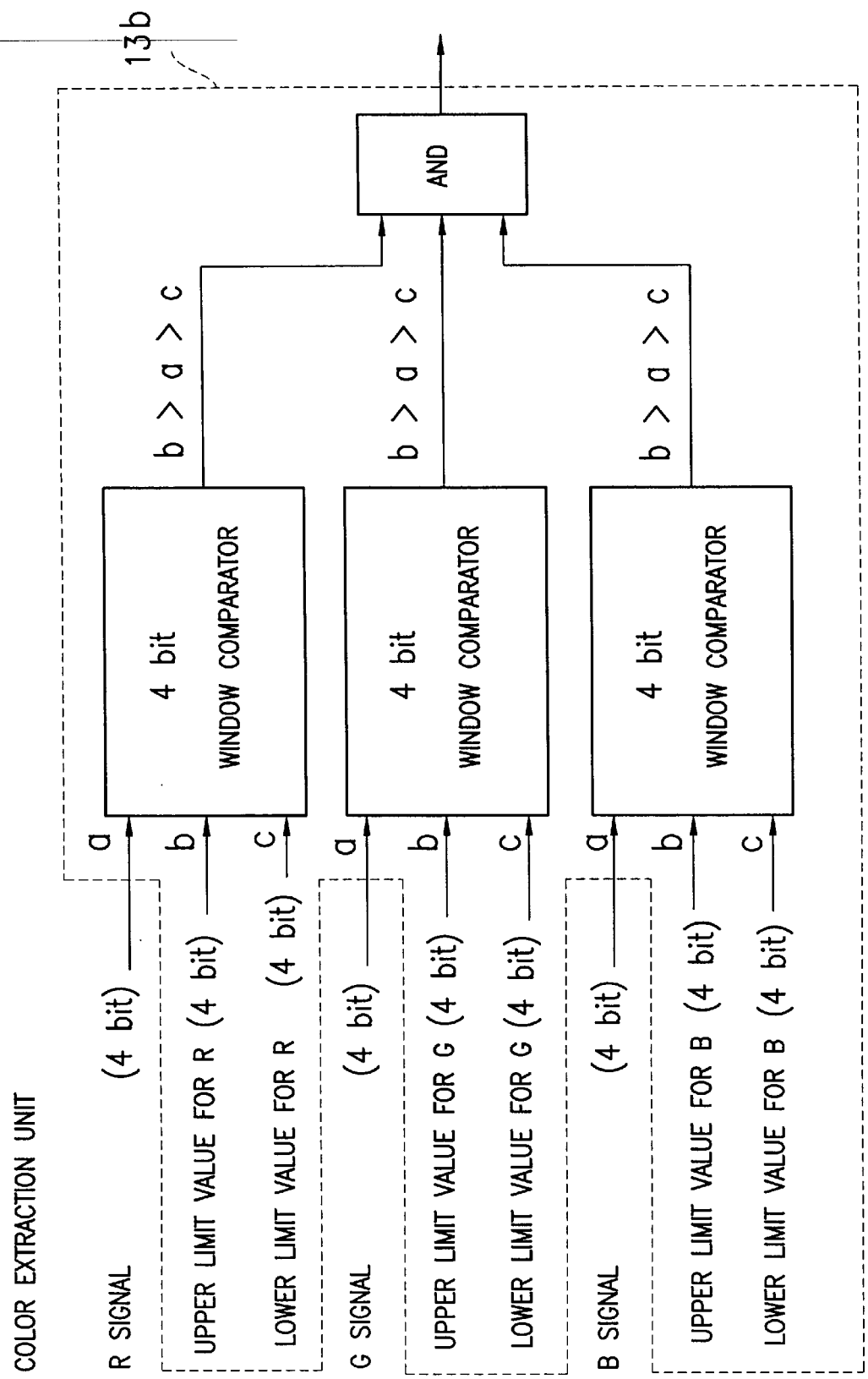
FIG. 7 shows the internal configuration of the color extraction unit.

Processing each RGB signal, mark color extraction unit 13b, shown in FIG. 7, extracts any pixel whose density falls within a fixed range (between an upper and a lower limit value). Unit 13b consists of three 4-bit window comparators which input RGB signals one by one and compare them with upper and lower limit values (when b>a>c, the output will be "1") and a three-output AND element which finds the logical product of the outputs of the three comparators. The upper and lower limit values used by the comparators have a specified margin with respect to the RGB signal expressing the color of the marks 2 which are to be detected. When a pixel is found for which each of the R, G and B components has a density within the fixed range, the output of the AND element will go to "1", and the pixel will be extracted as a prospective constituent of a mark.

Mark color extraction unit 13b uses a 4-bit window comparator because printed materials in general suffer from extreme non-uniformity (variation) of color. Higher color resolution would be pointless. However, as pattern recognition requires accuracy, mark shape extraction unit 13a uses an 8-bit comparator, as mentioned above. Separating pattern recognition from color extraction in this way allows us to extract the mark accurately and absorb errors due to variation among the component colors constituting the mark so that the mark can be specified correctly.

The color component signal used for the determination made by mark shape extraction unit 13a (the B signal) should not be used for the determination made by mark color extraction unit 13b. Rather, the R and G signals should be input into two 4-bit window comparators, and the output of these two comparators should be sent to a dual-input AND element. This method allows the circuit configuration to be simplified. It will frequently happen that the outputs of the window comparators processing the B signal in mark color extraction unit 13b and the mark extraction unit will both be "1". When the density of a specified signal such as yellow is high, there will be many occasions when the density value reaches the upper or lower limit value set in the window comparators (FF . . . or 00 . . . ). On these occasions, the determination processing will be virtually identical to the comparator determination shown in FIG. 6. Thus eliminating the determination processing in such cases will not appreciably affect the accuracy of detection.

The aforesaid binary processing unit 13 shown in the drawing is designed to extract marks 2 of a single color (including similar colors which fall in the range extracted by unit 13b). If a number of different colors are used for marks 2, the appropriate number of mark color extraction units 13b could be provided along with mark shape extraction unit 13a and connected in parallel to image input unit 12. If completely different colors are used, a system of binary processing units 13 could be provided such that all outputs are sent to an OR element which would find their logical sum and generate a final binary image.

If the densities of the color component signals used to recognize the mark are virtually identical and those of the other color component signals are different, a single mark shape extraction unit 13a could be used while a number of mark color extraction units 13b are systematized so that the outputs of all units 13b are connected to and OR element. The output of this OR element and that of mark shape extraction unit 13a would be connected to an AND element. With such a configuration, the actual marks 2 could be several different colors and the dummy marks 4 could be still other colors. This would make it extremely difficult for an uninformed person to figure out which of the marks are meaningful. If the image processing device contains a binary processing unit 13 like that described above and/or an appropriate combination of constituent circuits and elements, it will be able to extract the pixels in the real marks 2 accurately, and its recognition rate will not suffer.

Figure 8A:
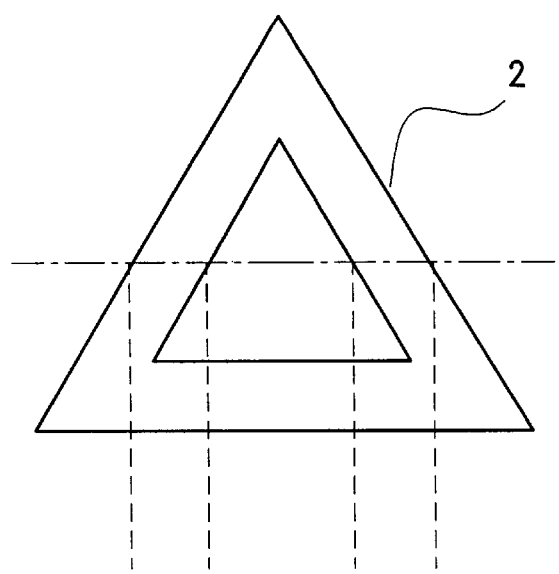
FIGS. 8(A) and 8(B) illustrate the operation of the binary unit.
Figure 8B:
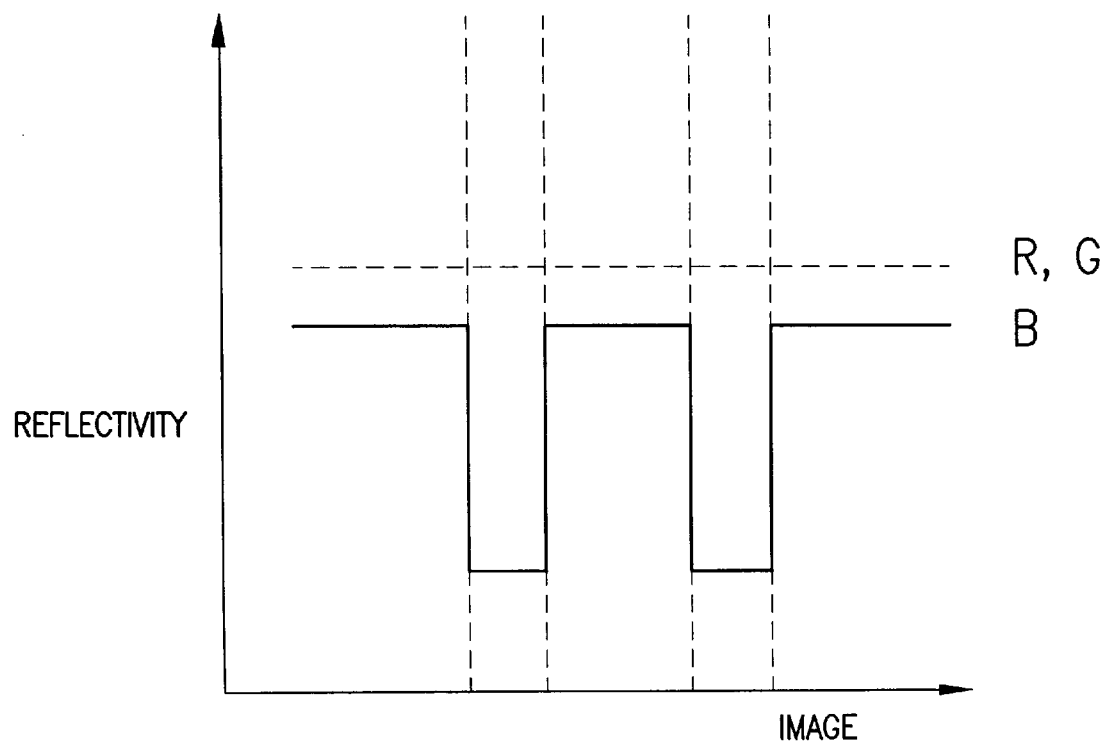

We shall now discuss the underlying principle used by the aforesaid binary processing unit 13. Let us consider a case in which triangular marks 2 (referred to below as "the portions enclosed by two triangles") are printed with yellow ink as shown in FIG. 8. If the other portion of the image is white, the portions where marks 2 are printed will absorb light of the B signal but will reflect light of the G and R signals. The rest of the image will reflect all of the RGB signals. Thus the reflectivity of the RGB signal with respect to the direction indicated by the dotted line in FIG. 8(A) would be such that B would be absorbed in the portions where marks 2 are found, as shown in FIG. 8(B). The B signal would have a large amplitude and the other color component signals would maintain a state of high reflectivity. Since this untreated reflectivity corresponds to the numerical value of the color signal, we can extract only those pixels which constitute marks 2 by setting an appropriate threshold value for the B signal.

Figure 9A:
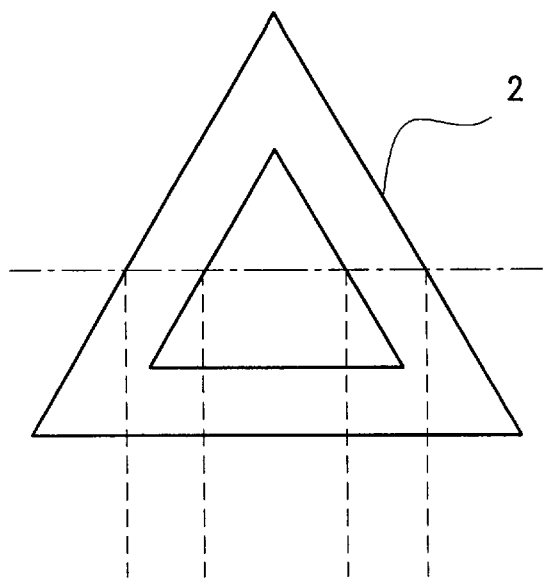
FIGS. 9(A) and 9(B) illustrate the operation of the binary unit.
Figure 9B:
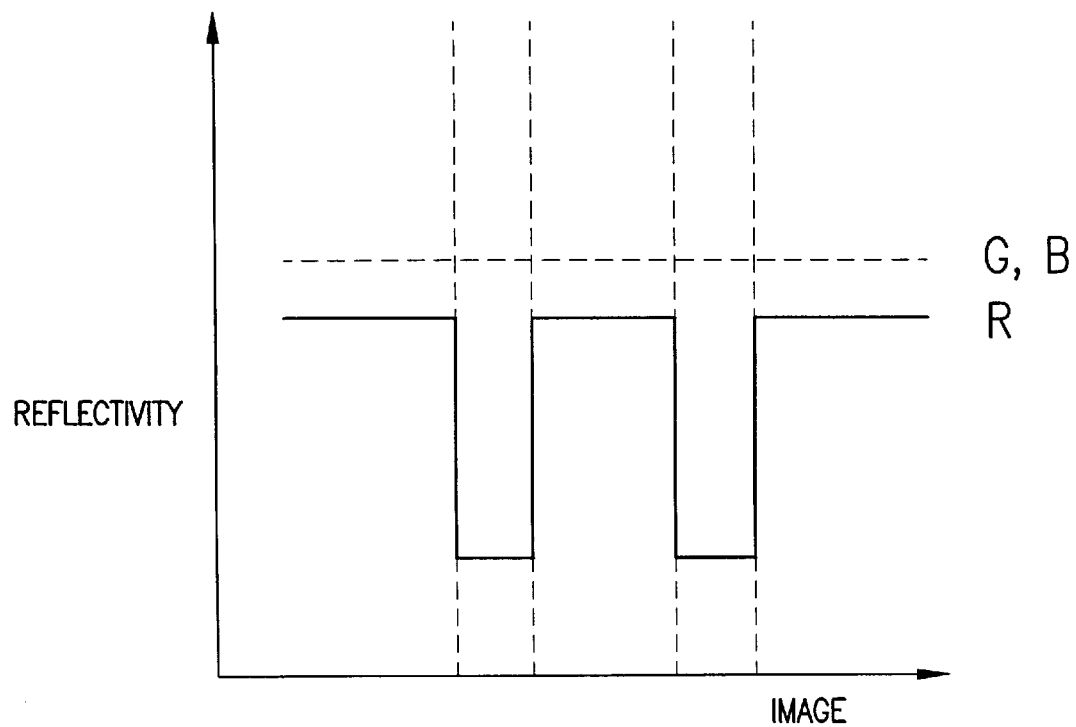
Figure 10A:
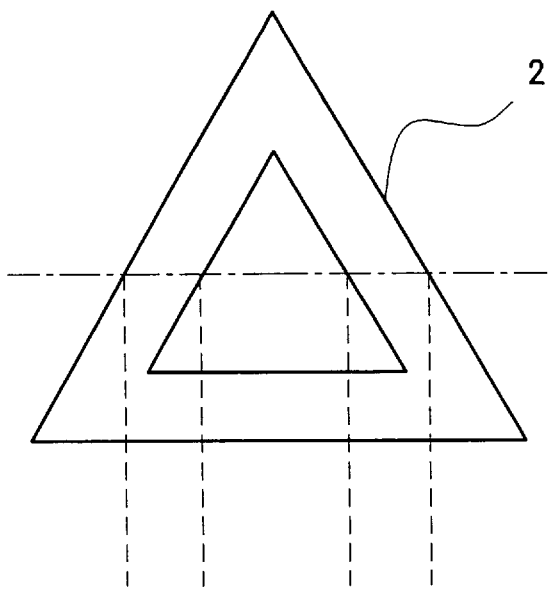
FIGS. 10(A) and 10(B) illustrate the operation of the binary unit.
Figure 10B:
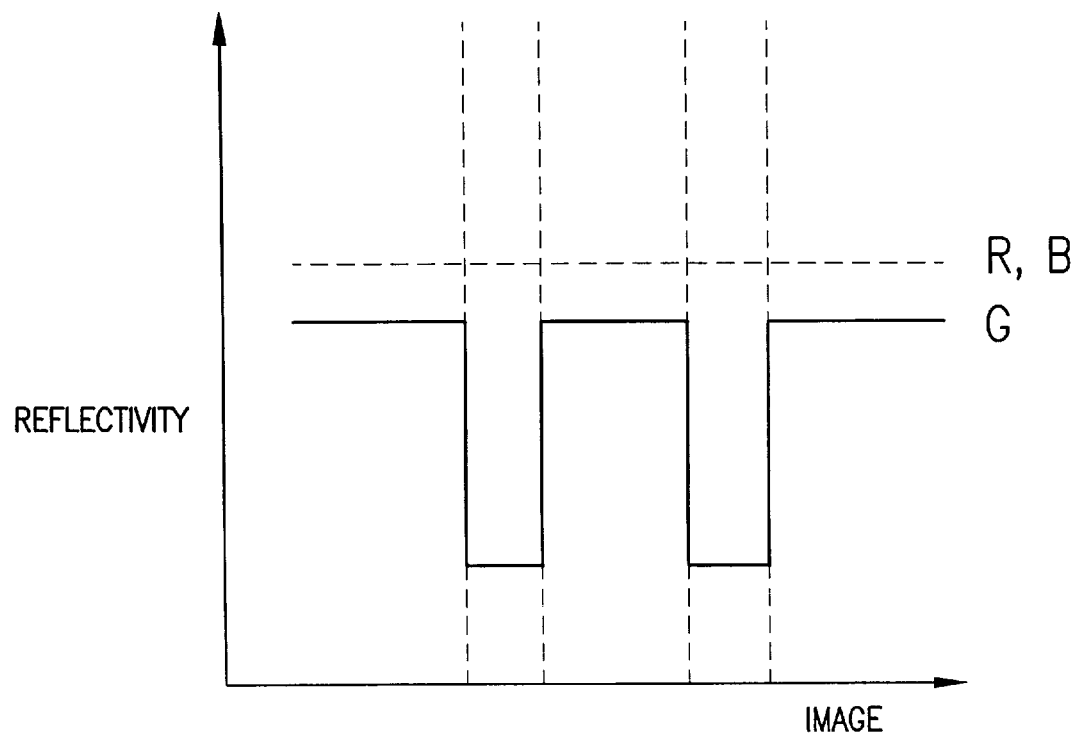

In the same way, if cyan ink is used, R will be selectively absorbed. The reflectivity of the pixels, as is shown in FIG. 9, is such that only the R signal changes significantly. If magenta ink is used, G will be selectively absorbed, and the reflectivity, as is shown in FIG. 10, is such that only the G signal changes significantly. If the marks are printed in cyan, then, the R signal should be input into the aforesaid mark shape extraction unit 13a. If they are printed in magenta, the G signal should be input.

Figure 11A:
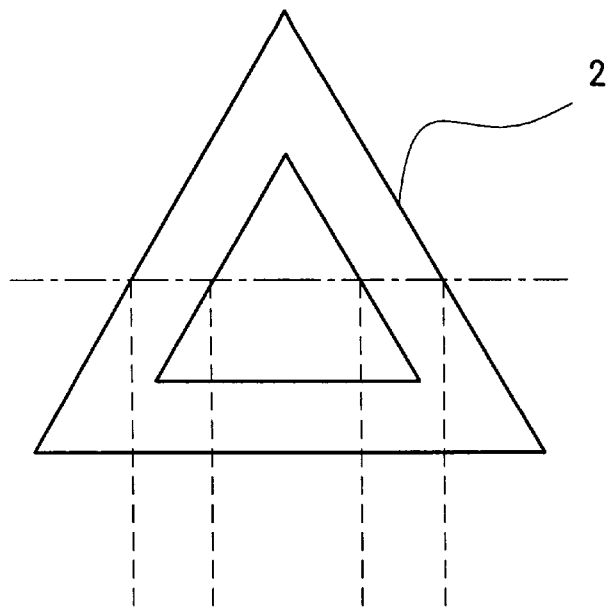
FIGS. 11(A) and 11(B) illustrate the operation of the binary unit.
Figure 11B:
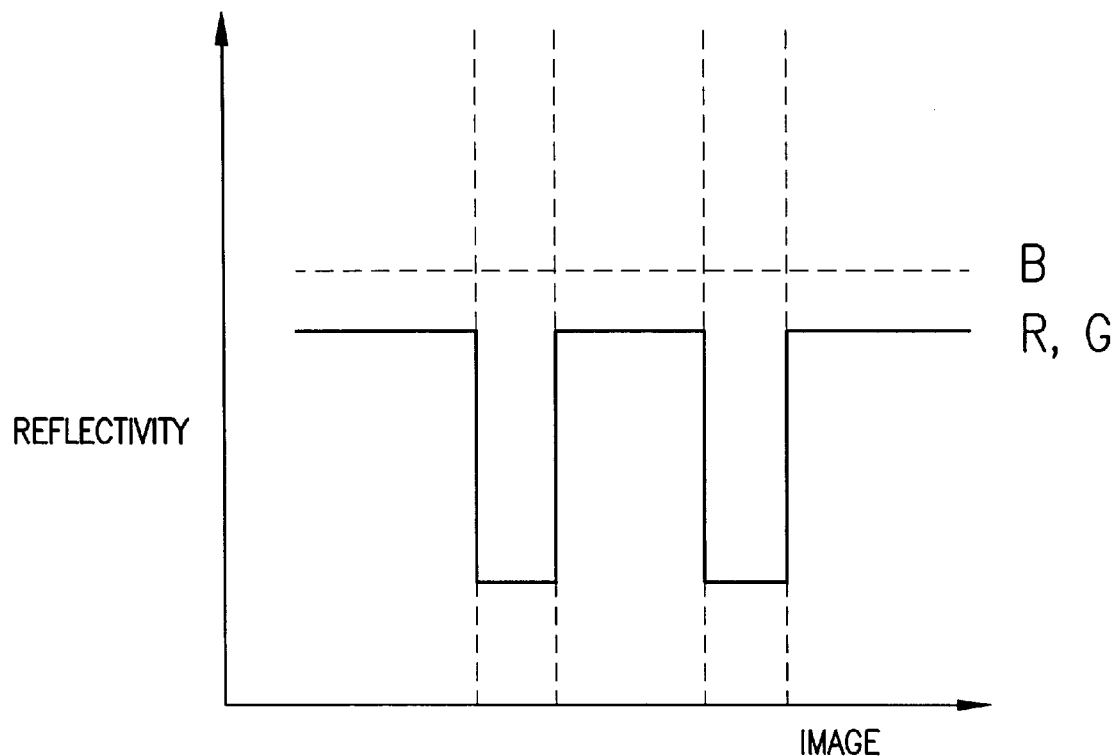
Figure 12A:
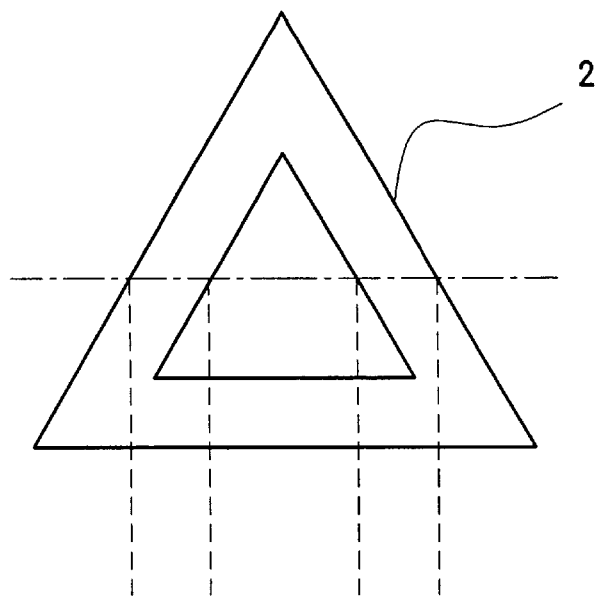
FIGS. 12(A) and 12(B) illustrate the operation of the binary unit.
Figure 12B:
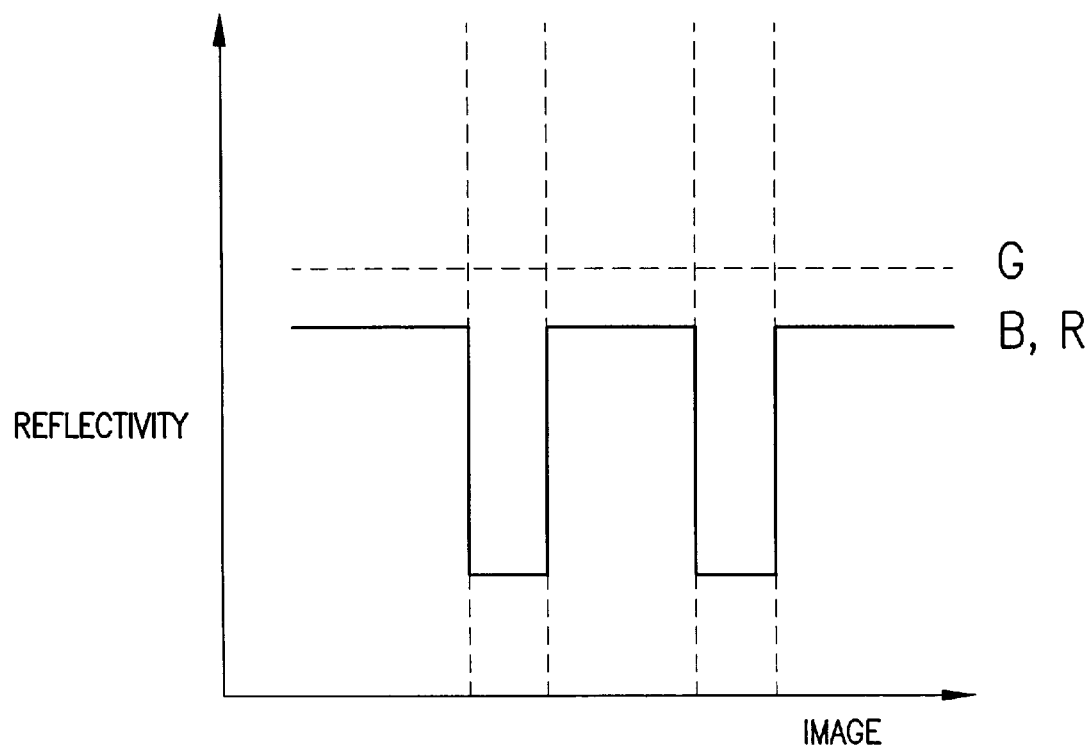
Figure 13A:
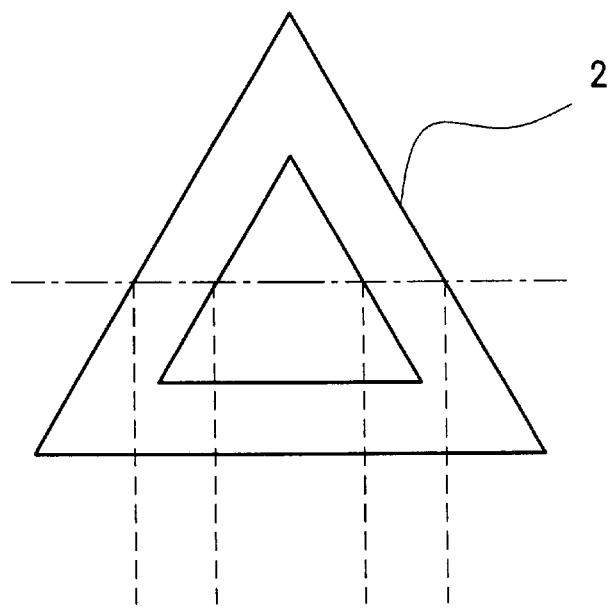
FIGS. 13(A) and 13(B) illustrate the operation of the binary unit.
Figure 13B:
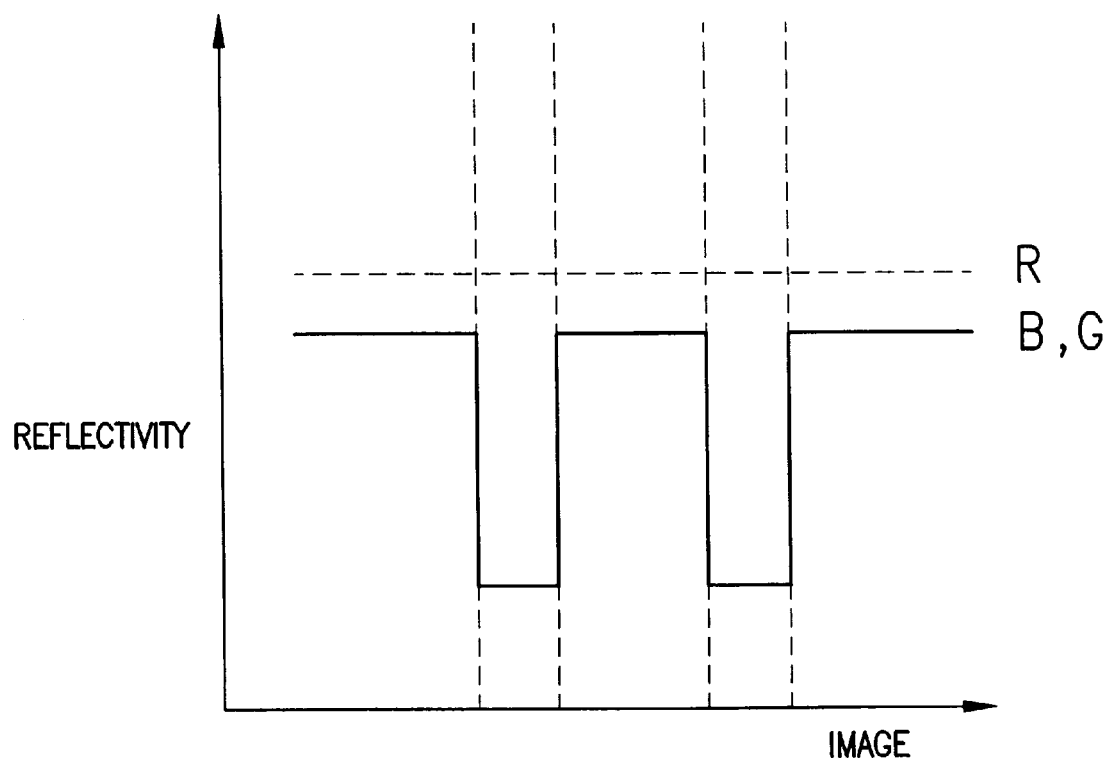

If marks 2 are printed in blue, green or red ink, two colors of light (the two which are not the color of the ink) will be absorbed, as is shown in FIGS. 11 through 13. If the marks are blue, the amplitude of the R and G signals will increase (FIG. 11); if they are green, the amplitude of the B and R signals will increase (FIG. 12); if they are red, the amplitude of the B and G signals will increase (FIG. 13). Thus if the marks we wish to detect are blue, either the R or the G signal should be sent to mark shape extraction unit 13a, as we can surmise from FIG. 11. When the image is binarized, the mark will stand out from the background.

To extract magenta marks using the method described above, the G signal should be binarized. However, this will also enable the simultaneous extraction of blue and red marks (see FIGS. 11 and 13). To extract magenta marks only (when red and blue marks are not used or are used only as dummies), mark color extraction unit 13b should have only one system and the upper and lower limit values used in the window comparator should be set high for the R and B signals and low for the G signal. This will insure that blue and red are not extracted by mark color extraction unit 13b. Only magenta marks will appear in the binary image output by AND element 13c. If we wish to extract red or blue marks as well, mark color extraction unit 13b must have as many systems as there are colors to extract. Upper and lower limit values for each color should be set so that the range includes the density needed to extract that color.

A binary processing unit 13 configured as described above outputs a binary image in which pixels which are the same color as mark 2 are expressed as "1" and pixels of other colors are expressed as "0". This image is stored in storage device 14, which in this embodiment consists of a given number of line buffers. Location detection unit 15 can use the aforesaid binary image to detect marks 2 and extract their locations. Once the locations of the marks are known, there is no need to store all the image data representing the document. Only a few dozen lines of buffer space are needed to store the data needed for subsequent processing.

Figure 14:
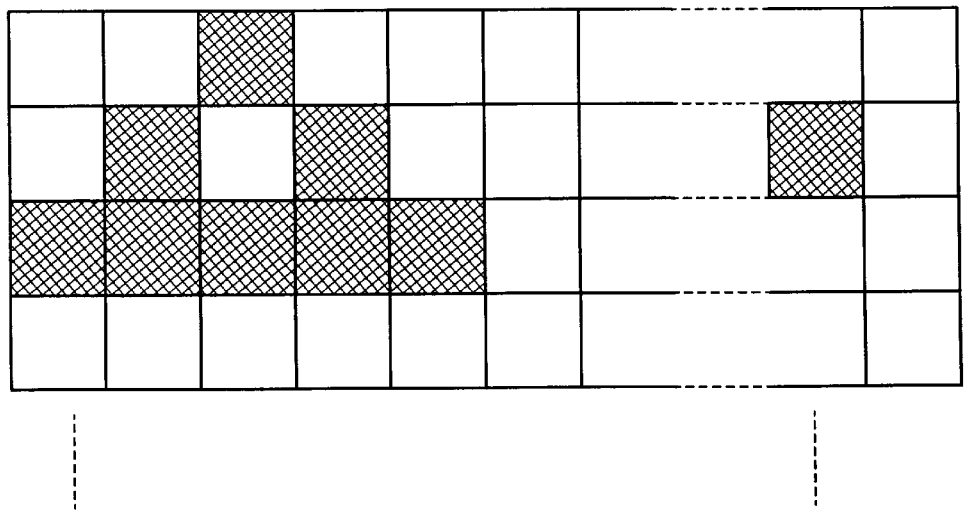
FIG. 14 shows an example of a pattern which might be stored in storage device 14.

An example of a binary image which would be stored in device 14 (the line buffer) is shown in FIG. 14. Each square in the drawing represents one pixel. In the example we have been using, marks 2 are triangles. In order to make them distinguishable from dirt smudges, we have left them white in the center. The mark shown in FIG. 14 is a minimal triangle. In this embodiment, the marks have been made as small as possible to enable the hardware needed to detect them to be made smaller as well as to make it more difficult for an uninformed person to find them. The mark of pixels which constitutes the actual mark is that shown in FIG. 14.

Figure 15:
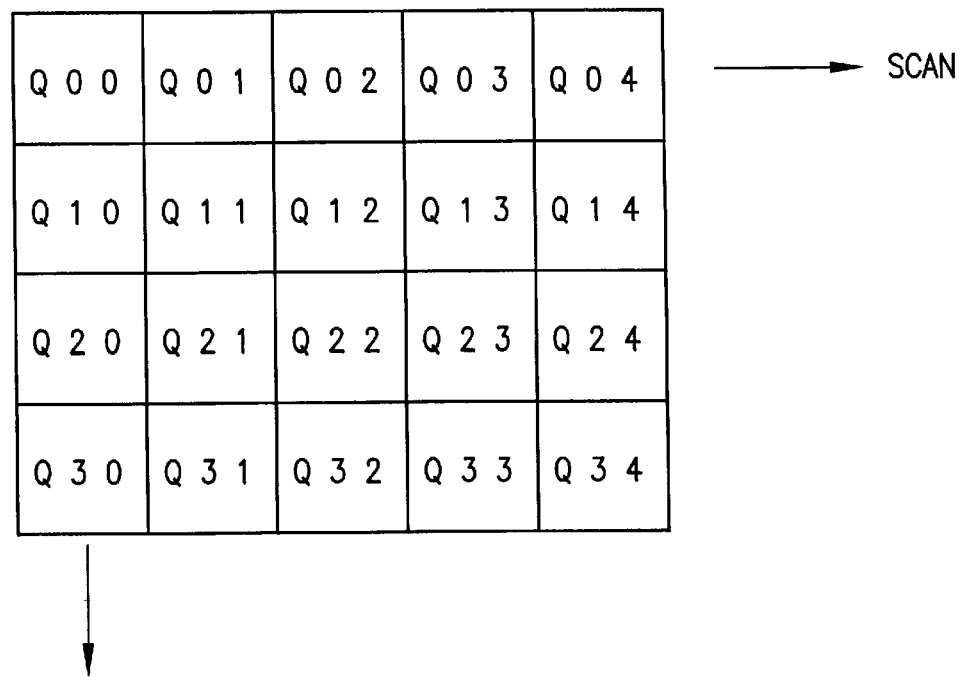
FIG. 15 shows the window used in the location detection unit.

Mark location detection unit 15 reads out the data stored in storage device 14 and detects the marks of pixels which constitute triangles like the one shown in FIG. 14. In this example, it uses a window of 5×4 pixels ($Q_{00}$ through $Q_{34}$) like that shown in FIG. 15. When the binary data for pixels $Q_{02}$, $Q_{11}$, $Q_{13}$ and $Q_{20}$ through $Q_{24}$ are "1" and those for the other pixels are "0", the HIT output goes to "1", and the location data are stored in storage device 16.

Figure 16:
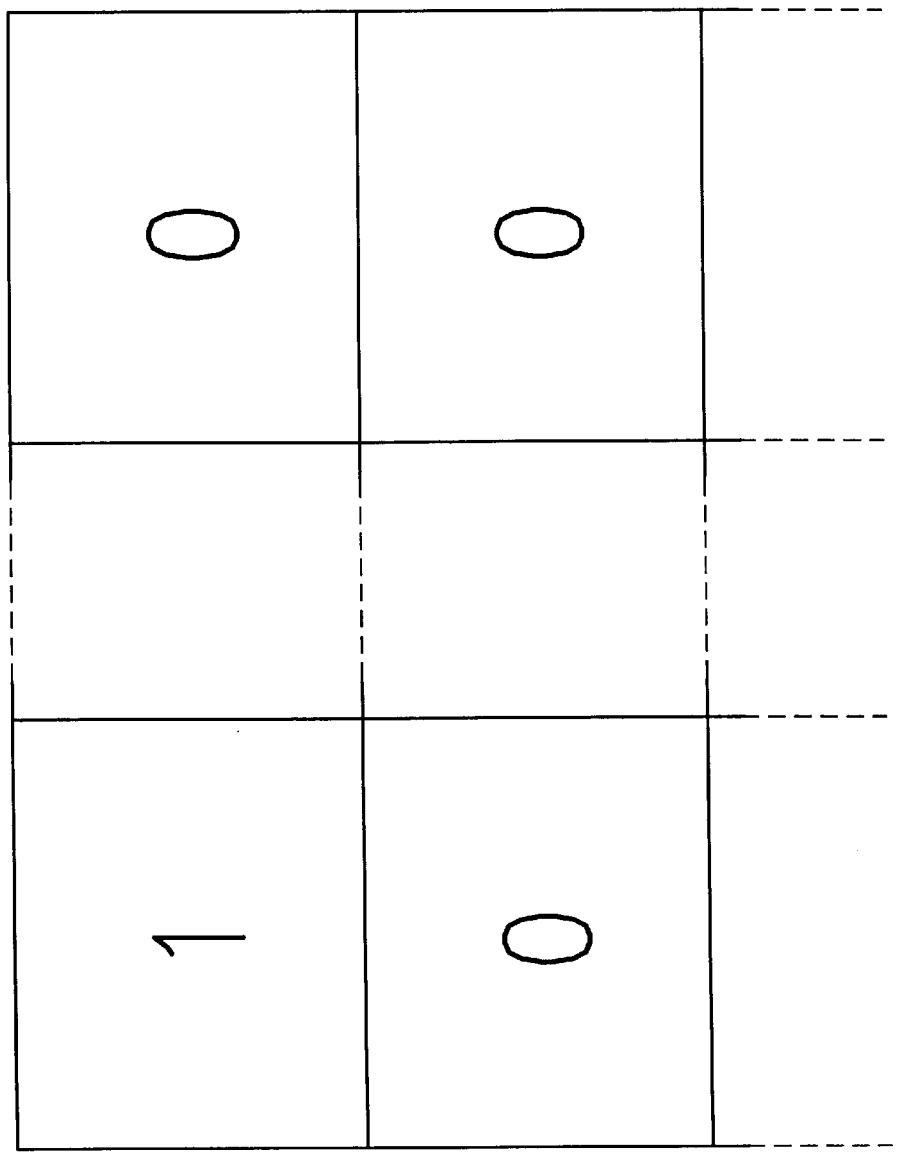
FIG. 16 illustrates the state of the data stored in storage device 16.

The result of this determination (mark has been found: 1; no mark has been found: 0) is stored in device 16. In this embodiment, a 5×4 pixel chunk like the one shown in FIG. 14 is stored as a single unit (See FIG. 16). In this way the volume of data is compressed to 1/20 of its former size. The subsequent processing to extract the mark (or rather, to extract the spatial relationship of the marks) can easily be executed using a small volume of data. The size of the chunks into which the data should be compressed should be determined so that a mark can fit into a single chunk. Alternatively, if a mark spans several chunks, one of the chunks (for example, the one containing the largest portion of the mark) will receive a "1" to indicate that a mark has been found.

Figure 17:
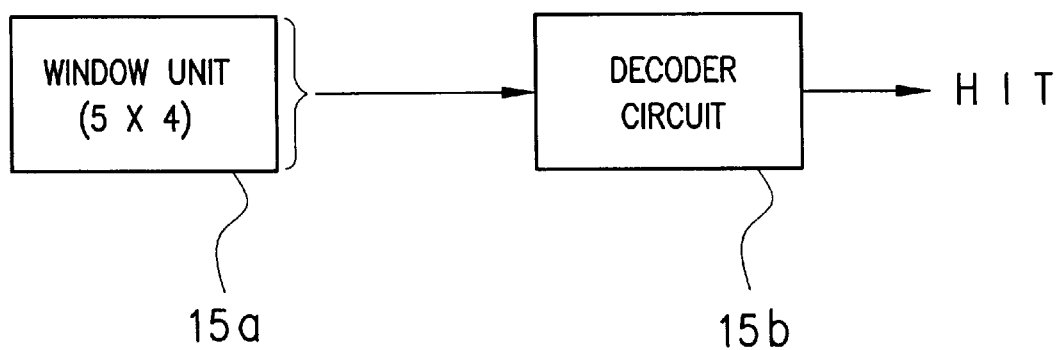
FIG. 17 shows the internal configuration of the location detection unit.

The internal configuration of mark location detection unit 15, the device which executes the processing discussed above, is shown in FIG. 17. Unit 15 consists of window unit 15a, which measures 5×4 pixels, and decoder circuit 15b, which receives the pixel data (1/0) detected by unit 15a and determines whether they are in a given arrangement.

Figure 18:
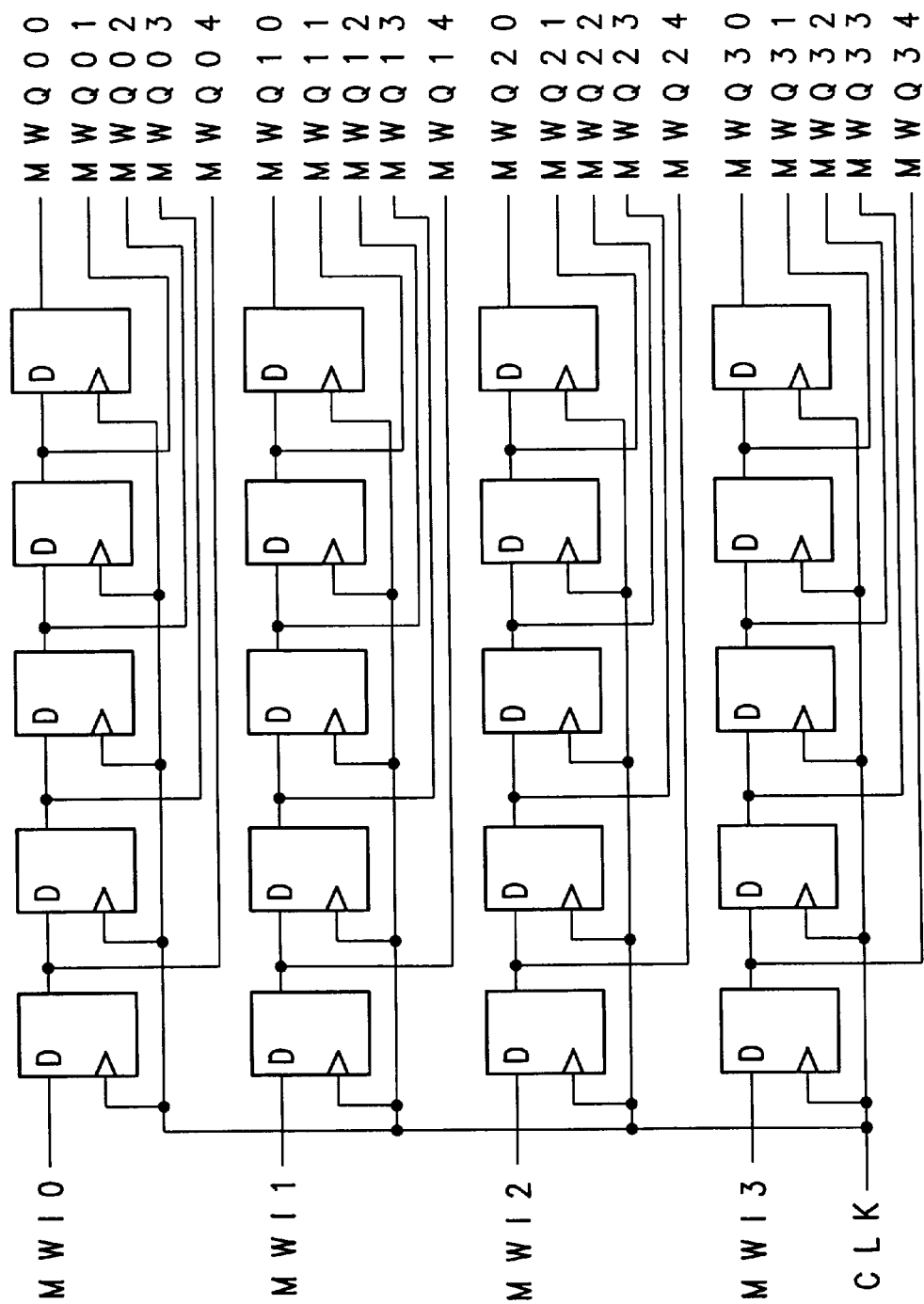
FIG. 18 shows an example of a window unit which might be used in the location detection unit.

More specifically, as is shown in FIG. 18, each $Q_{ij}$ in the window consists of a flip-flop. The window has four rows in each of which five flip-flops are connected in series. A row of flip-flops corresponds to the pixel data (1/0) stored on a single line in the line buffer which serves as storage device 14. The data are input into the flip-flops, starting with the head flip-flop, in order from the first pixel. Each flip-flop simultaneously receives a clock (CLK) signal. Once synchronized, it transmits the data to the next flip-flop.

When clock signals are input one by one, the input of data to the flip-flops assumes the same form as scanning pixel by pixel in the scanning direction. When the final pixel data for a given line (1/0) have been input, we begin to input data to the head flip-flop of the next line down. This is identical to moving down one pixel in the feed direction. Consequently, the output of the flip-flops when five pixels' worth of data have been input will be as shown in the drawing and will be equivalent to the window pictured in FIG. 15. The output $MWQ_{ij}$ (i=0 through 3, j=0 through 4) of each flip-flop is sent to decoder circuit 15b.

Figure 19:
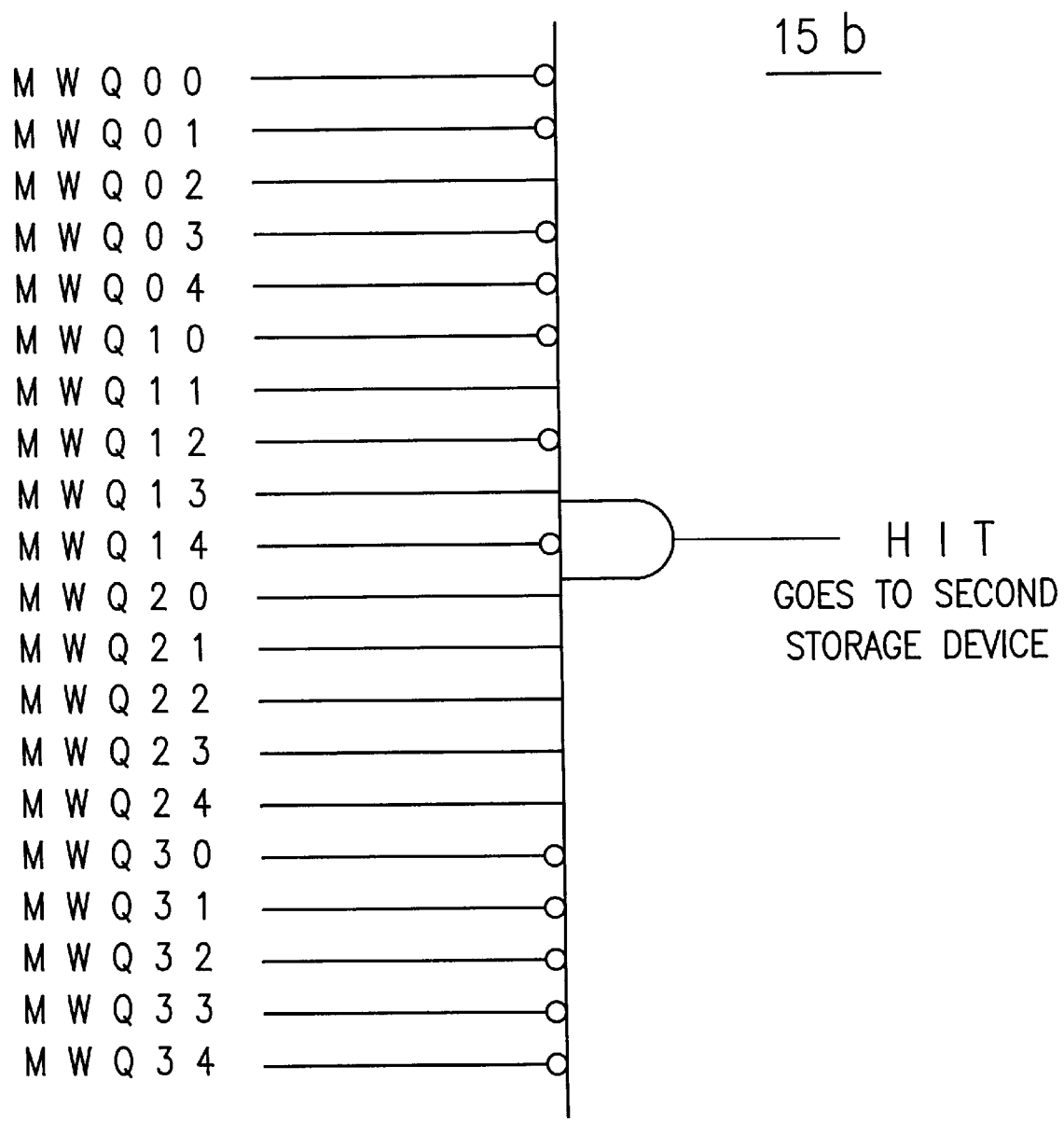
FIG. 19 shows an example of a decoder circuit which might be used in the location detection unit.
Figure 20:
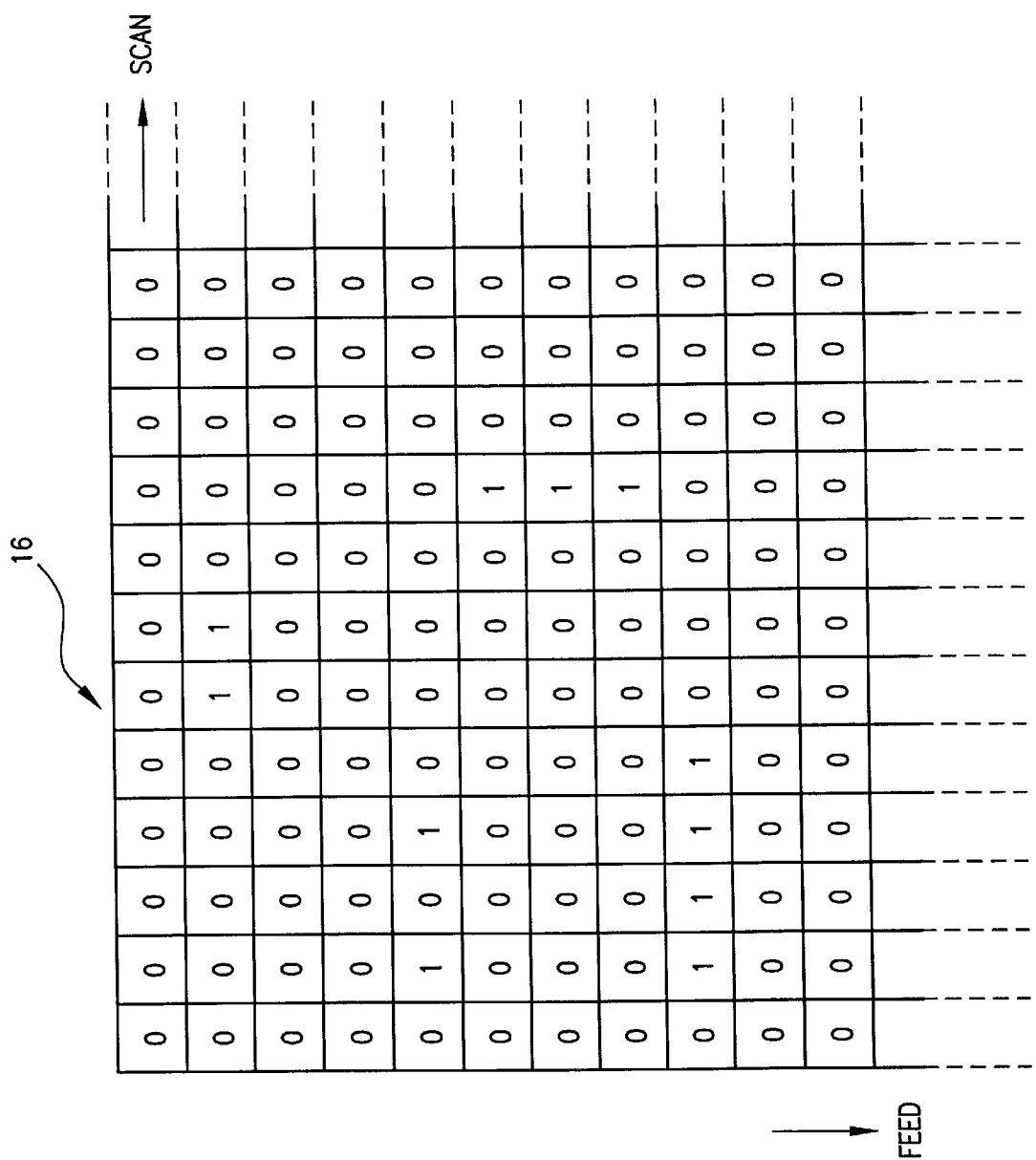
FIG. 20 illustrates how the data are stored in storage device 16.

Decoder circuit 15b, which is pictured in FIG. 19, consists of a 20-input AND element. When a mark is input, the input terminals constituting white pixels have their input reversed. Thus when black pixels "1" are lined up in a given shape, all the inputs of the AND element which constitutes the decoder circuit go to "1", and the HIT output of the decoder circuit goes to "1". If the value of a single pixel is different from the that of the others, one of the inputs to the AND circuit will be "0", and the HIT output of the decoder circuit will go to "0". Based on the output of decoder circuit 15b, data representing the locations of all the valid marks 2 are stored in storage device 16. If we are to map out the internal data stored in device 16 when the pattern has been detected, they would be arranged as shown in FIG. 20. Each square in the drawing corresponds to a 5×4 pixel chunk of the image data captured when the document is imaged.

As stated above, mark location detection unit 15 outputs a compressed binary image in which portions where marks 2 are found go to "1" and pixels of other colors are expressed as "0". This image is stored in storage device 16, which in this embodiment also consists of a given number of line buffers. Since the specified pattern is detected based on this compressed binary image, there is no need to store all the image data representing the document. Only a few dozen lines of buffer space are needed to store the data needed for subsequent processing.

Figure 21:
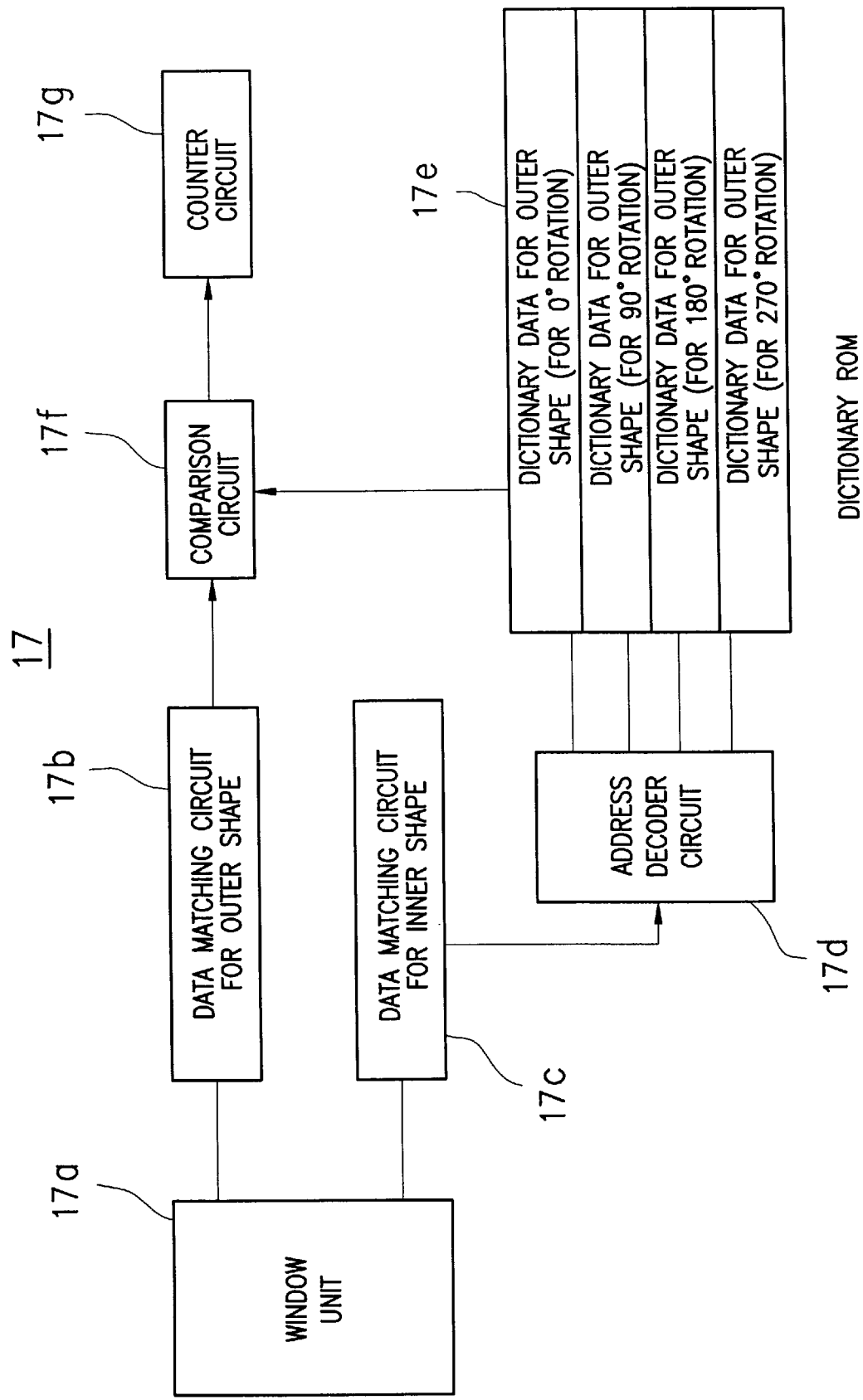
FIG. 21 shows the internal configuration of the arrangement matching unit.

Pattern location matching unit 17, the device which detects pattern 1, is configured as shown in FIG. 21. It has a window 17 of a given size, which it uses to scan the mark data (1/0) stored in device 17.

Figure 22:
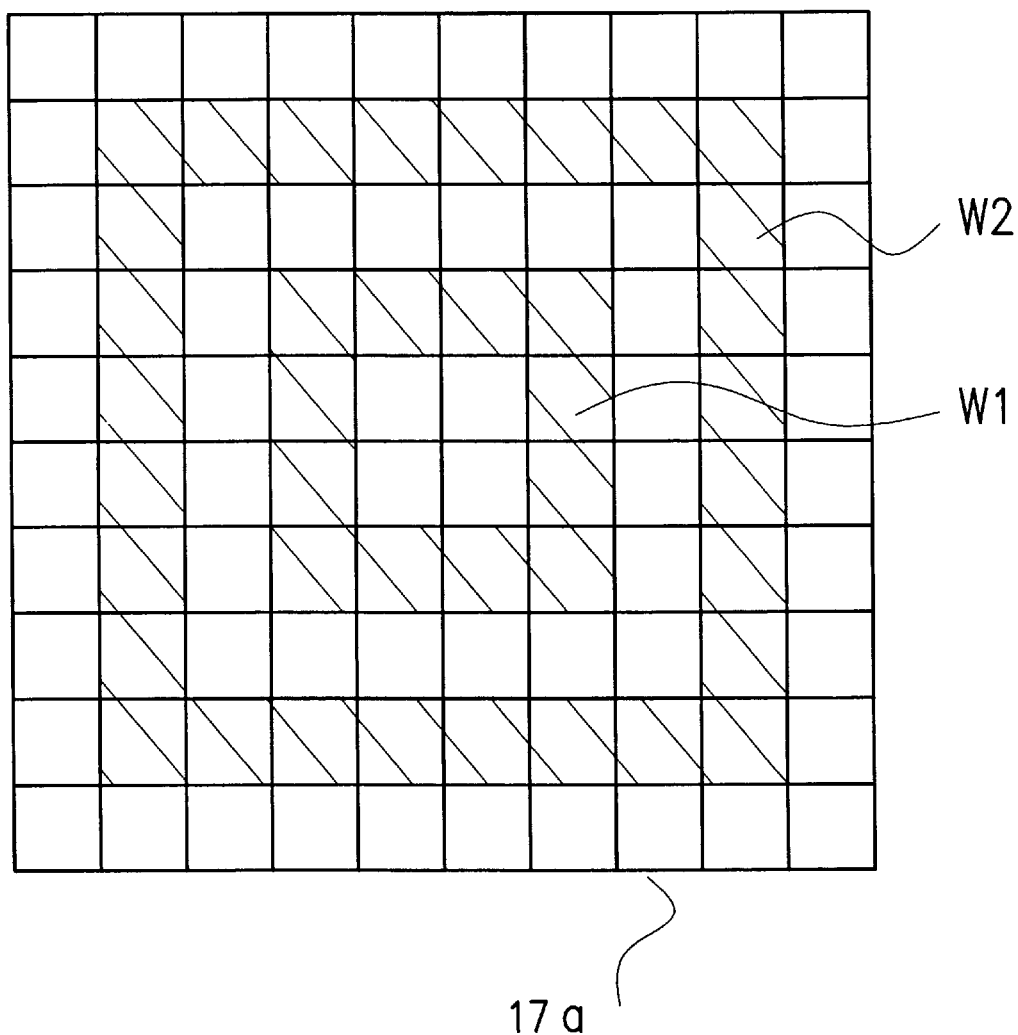
FIG. 22 illustrates the concept used in the window element of the arrangement matching unit.

In this example, pattern 1 consists of a number of marks 2 placed along the outlines of two squares, as shown in FIGS. 1 and 2. For this reason it is desirable to extract simultaneously all the "1"s stored in device 16, which can be seen in FIG. 20. Leaving a margin one chunk wide around the outer square on which the marks are placed, we use a window of 10×10 chunks, as shown in FIG. 22. The hatched portions of the drawing (inner square $W_1$ and outer square $W_2$) are the regions where data will actually be collected.

Figure 23:
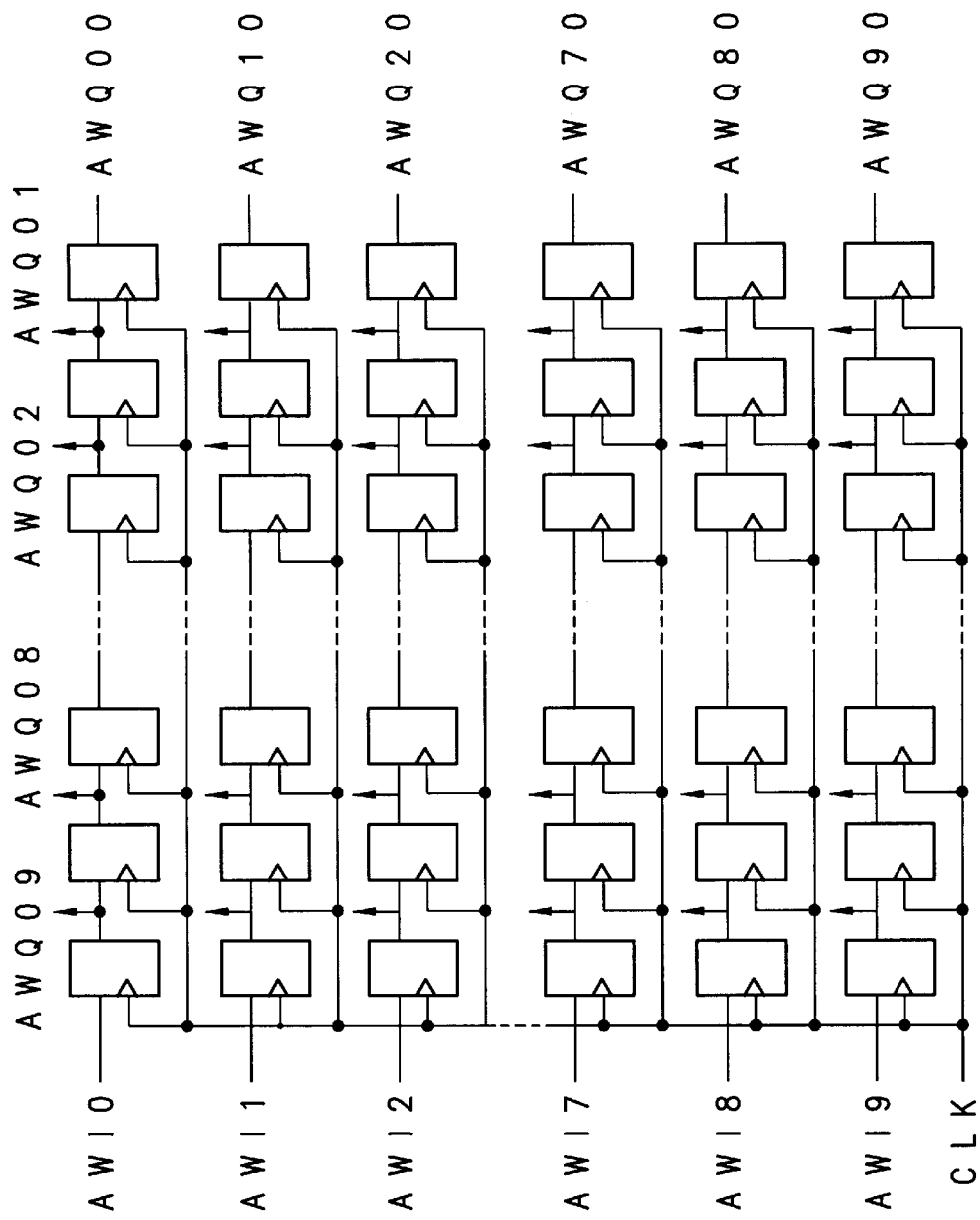
FIG. 23 shows the actual hardware constituting the window element.
Figure 29:
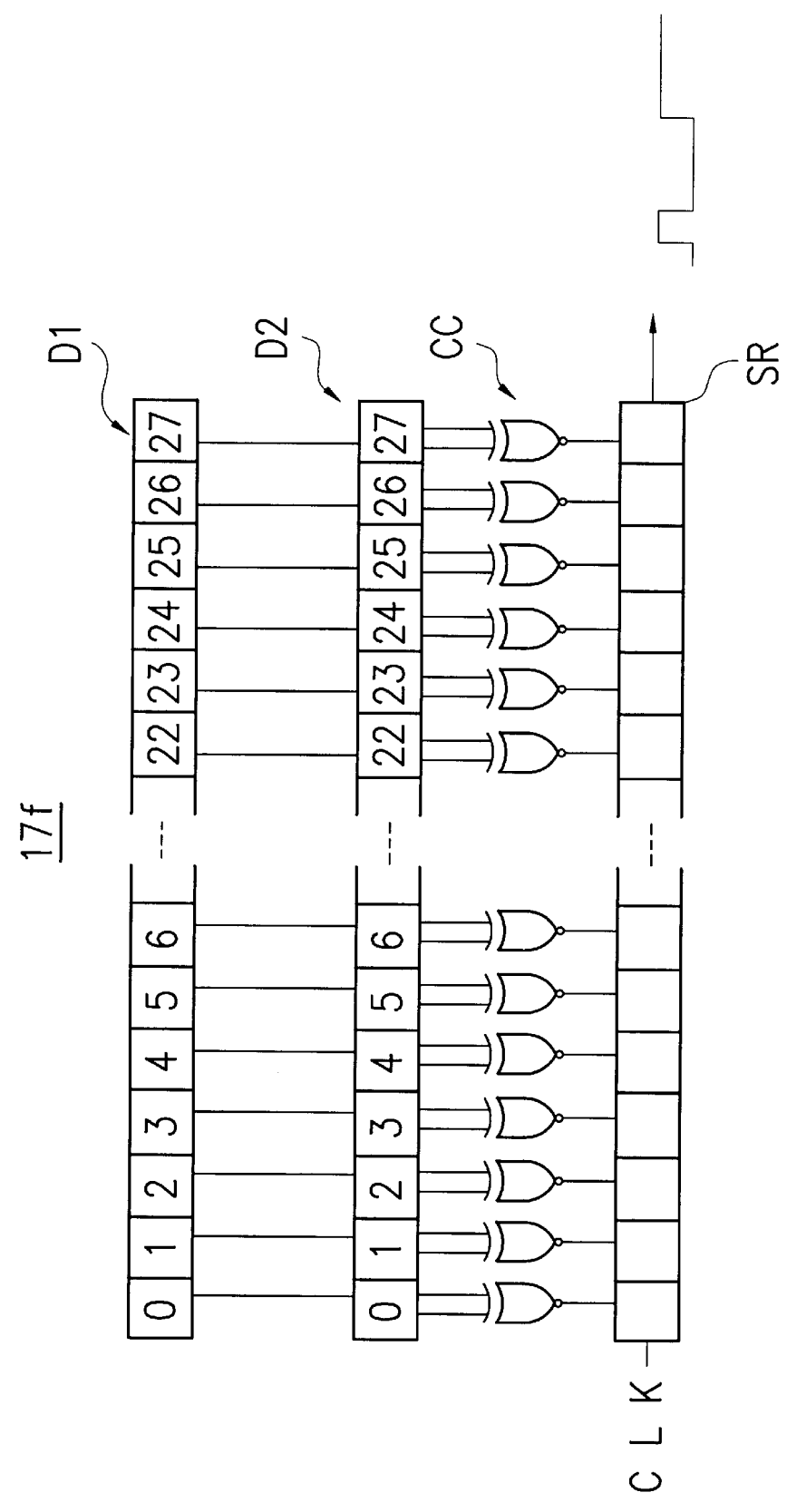
FIG. 29 shows an example of a comparison circuit which could be a component of the arrangement matching unit.

The actual configuration of window unit 17a is shown in FIG. 23. Ten rows of flip-flops with ten serial inputs and parallel outputs are provided. Data in a given line buffer of device 16 are input into the corresponding row of flip-flops in order starting with the head flip-flop. The operation is identical to that of the aforementioned 5×4 pixel window unit 15a in mark location detection unit 15. Data synchronized by a clock signal CLK are transmitted in order. The output of the flip-flops at any given moment, as shown in FIG. 24, functions as a 10×10 unit window.

The units in the output which correspond to the hatched portions of FIG. 22 are AWQ33 through 36, 43, 46, 53, 56 and 63 through 66 (inner square $W_1$) and AWQ11 through 18, 21, 28, 31, 38, 41, 48, 51, 58, 61, 68, 71, 78 and 81 through 88 (outer square $W_2$). These data can be used to detect pattern 1.

The data stored in the units of outer square $W_2$ (the outputs of the specified flip-flops stated above) are sent to latching circuit 17b; those stored in the units of inner square $W_1$ (the outputs of the specified flip-flops stated above) are sent to latching circuit 17c. These circuits latch to conform to the working of window unit 17a.

Latching circuit 17b consists of 28 D latches (flip-flop groups with parallel input and parallel output), as shown in FIG. 25. These latches maintain the input data as they are when the latch signal is received. In this example, AWQ15 is the head of the unit outputs constituting the window in FIG. 24. The units which correspond to the location of outer square $W_2$ are arranged in order in a clockwise circuit. Accordingly, as is shown in FIG. 25, AWQ15 is input to the head D latch and AWQ14 is input to the final D latch.

Similarly, latching circuit 17c consists of 12 D latches as shown in FIG. 26. AWQ35 is the head of the unit outputs constituting the window in FIG. 24. The units which correspond to the location of inner square $W_1$ are arranged in order in a clockwise circuit. AWQ34 is input to the final D latch.

As is shown in FIG. 21, the output of latching circuit 17c is sent to address decoder circuit 17d. The 12-bit data latched in circuit 17c are used as address data to access the corresponding portion of dictionary storage unit 17e. Dictionary data for 0 deg., 90 deg., 180 deg. or 270 deg. on the outer square are output to comparison circuit 17f. The 28-bit data latched in latching circuit 17b are sent to comparison circuit 17f, where the data are compared bit by bit. The result, match or no match, is transmitted to counter circuit 17g.

Generally when a document is copied, it must be placed parallel to the sides of the glass. Although the document may be parallel, it sometimes happens that it has been placed on the glass with its top and bottom or left and right sides reversed. Thus a specified pattern on a document may be oriented in any one of four directions, as shown in FIGS. 27 (A) through (D). When the marks 2 constituting pattern 1 are stored in a specified area of storage device 16, the data latched in latching circuits 17b and 17c by way of latching unit 17a are arranged in four ways, as shown in FIG. 28.

The data arrangement is stipulated in this way, and the relationship of the data latched by a mark on inner square $W_1$ at a given angle of rotation to the data latched by a mark on outer square $W_2$ is one to one. If the marks have been arranged appropriately, the data will be different at the four angles of rotation shown in FIGS. 27 and 28. If we find a match while trying to determine which data arrangement a certain region (in this example, inner square $W_1$, which has fewer data) corresponds to, there is a high probability that we have found the specified pattern. Since we now know its angle of rotation, we can use the data latched from outer square $W_2$ as reference values (i.e., data which are valid if this is the specified pattern). We compare these reference values with the actual data obtained from outer square $W_2$. A high coincidence indicates that the pattern has been recognized. Arrangement matching unit 17 uses this same principle.

In this embodiment, efficient use is made of the data from inner square $W_1$ and outer square $W_2$. As discussed above, the less voluminous data from inner square $W_1$ are used as addresses. The data strings in the units in FIG. 28 are stored at specified addresses in dictionary storage unit 17e.

The data latched by the circuit for the inner square, 17c, are used as addresses. If there is a match with one of the four addresses shown in FIG. 28, the data stored in dictionary storage unit (ROM) 17e which correspond to this address are read out and compared by comparison circuit 17f. By checking whether there is an address which corresponds to the mark data on inner square $W_1$, we determine whether the marks we have found are arranged in pattern 1. Comparing the mark data on outer square $W_2$ with reference values which have been read out also allows us to determine whether the marks we have found are arranged in pattern 1.

Comparison circuit 17f is composed of D latch unit $D_1$, which stores the data collected from the outer square; D latch unit $D_2$, which stores the dictionary data (i.e., the reference data) it receives from dictionary storage unit 17e for the outer square at specified angles of rotation; a dual-input coincidence circuit CC, which compares the data stored in latches $D_1$ and $D_2$; and parallel input-series output shift register SR, which receives each output of coincidence circuit CC and outputs it in the same order. Units $D_1$, $D_2$, CC and SR each have 28 stages to correspond to the number of data (28) comprising outer square $W_2$.

When this configuration is used, the data transmitted by latching circuit 17b and those received from dictionary storage unit 17e (the reference data) are stored in their respective latching units, $D_1$ and $D_2$. They are input into coincidence circuit CC in response to a specified timing signal. If the reference data and the data indicating the actual locations where the marks are extracted are identical, the output of coincidence circuit CC will go to "1". If they are not, it will go to "0". The result of this determination is stored in the corresponding shift register SR. A shift clock is applied to shift register SR, and the data stored in it are input to counter circuit 17g in order, bit by bit.

Counter circuit 17g counts the number of data which are "1". If all the data acquired from outer square $W_2$ coincide with the reference data stored in the dictionary, the 28 bits output by the shift register will all be "1". If none of them coincide, the 28 bits will all be "0". The higher the count value, then, the higher the goodness of fit of the data to the specified pattern. In this example, the count value is the goodness of fit of the detected pattern with respect to the specified pattern. This count value is output by way of goodness output unit 18 to the copy machine.

Based on the goodness of fit which it obtains, the copy machine decides if the document being processed is non-reproducible. If it determines that the document is non-reproducible, it executes the specified processing to prevent copying. Alternatively, the image processing device decide if the document is non-reproducible. When the goodness of fit exceeded a threshold value, it would judge the document to be non-reproducible and output a signal indicating detection.

Figure 30:
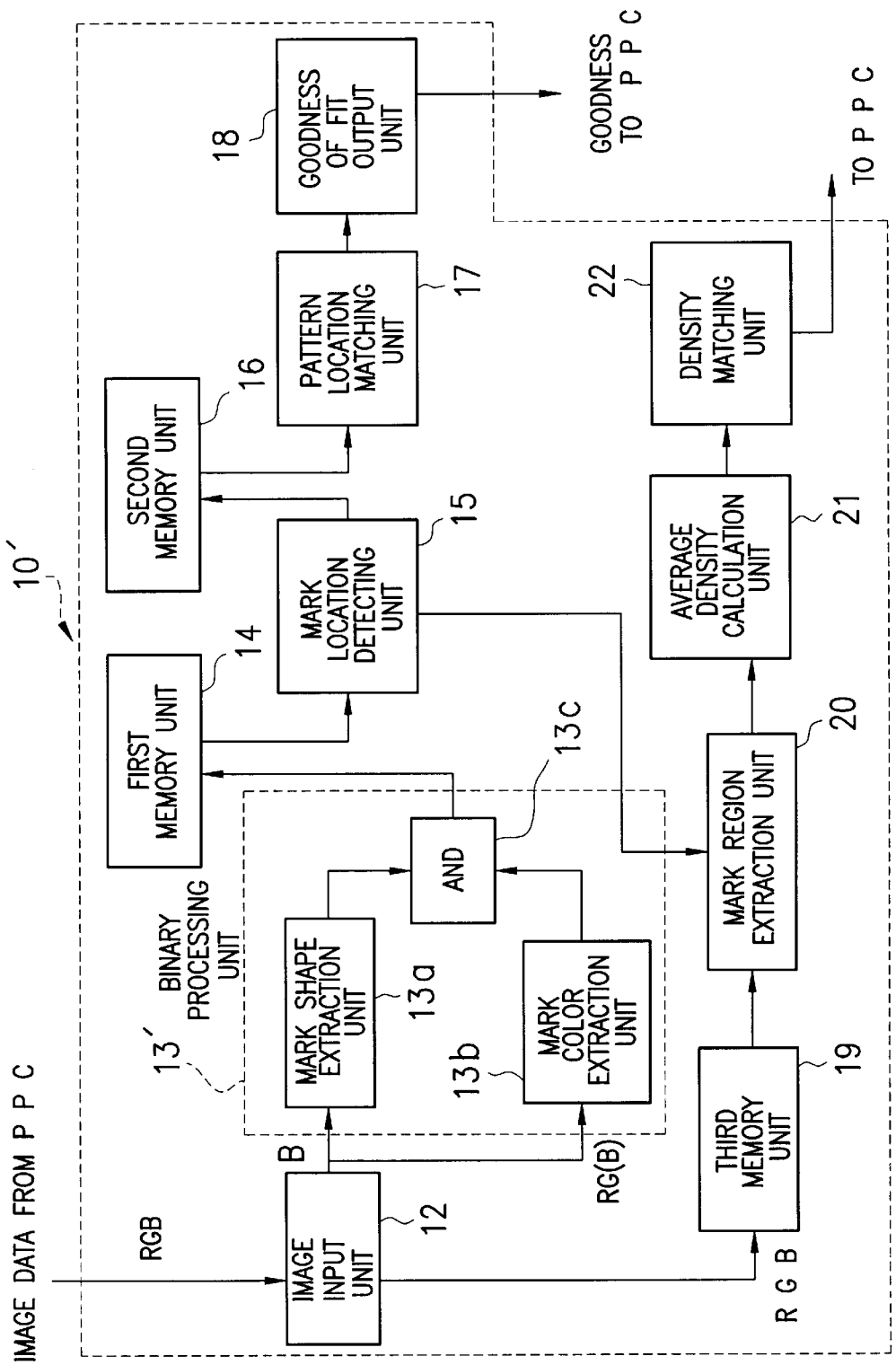
FIG. 30 shows the overall configuration of the second ideal embodiment of the image processing device of this invention.
Figure 31A:
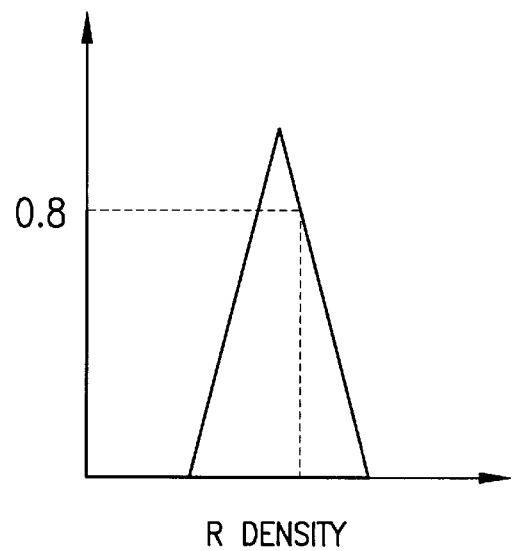
FIGS. 31(A)–31(C) illustrate the function of the density matching unit.
Figure 31B:
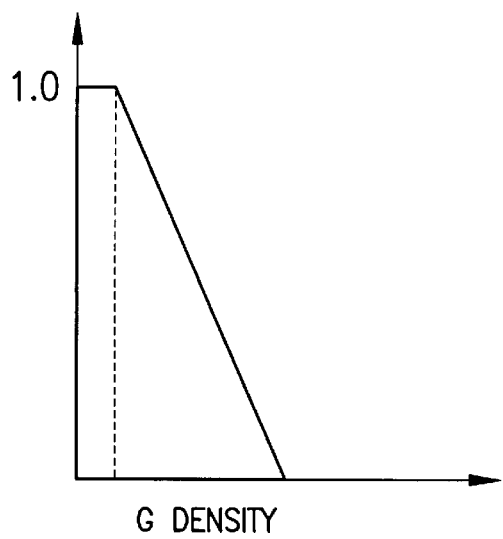
Figure 31C:
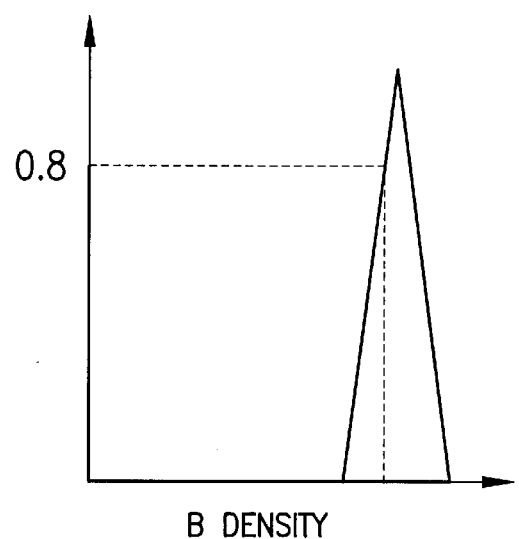

FIGS. 30 and 31 show another image processing device which is an ideal embodiment of this invention. This device is based on the ideal embodiment we have been discussing, but its pattern recognition is more reliable. Our second ideal embodiment, image processing device 10', has, in addition to the devices seen in the first embodiment which calculate the goodness of fit of the shape, the capability of calculating the goodness of fit of the color of the marks. Based on both the shape and color data, a cumulative judgment can be made as to whether the specified pattern has been found. The pattern 1 and marks 2 detected by this device are the same as those used in the first embodiment. Marks 2 are printed in yellow ink in the dot mark shown in FIG. 14. Pattern 1 consists of the arrangement of marks 2 shown in FIG. 1.

In our discussion of the actual configuration of this device, components which have the same function that they had in the first embodiment (including those with more output ports) are labeled with the same numbers; we will not discuss them further. We begin our discussion of points which differ from the first embodiment with input unit 12, whose output is transmitted to both binary unit 13 and third memory unit 19. Unit 19 stores the untreated RGB data as multiple values. It outputs to extraction unit 20 the data required to extract the areas where the marks are found.

Extraction unit 20 receives the output of mark location detection unit 15, needed to calculate the goodness of fit of the shape. When the marks 2 which constitute pattern 1 have been detected (i.e., when the HIT output of detection unit 15 is "1"), the density data (RGB) for the pixels in a 5×4-pixel region around the location of a mark (i.e., the region where a mark 2 is found) are read out of third memory unit 19 and transmitted to unit 21, which calculates their average density. The 5×4-pixel region which is extracted includes the pixels which surround the mark. It would, of course, also be possible to transmit to calculation unit 21 only the density data for pixels which actually constitute the mark in the 5×4 pixel region (the black pixels in FIG. 14).

Calculation unit 21 obtains the average values of the R, G and B densities it receives from extraction unit 20 and outputs them to density matching unit 22.

Matching unit 22 matches the averages of the R, G and B densities which it receives from calculation unit 21 against previously recorded color data to obtain the goodness of fit of the color. An example of an algorithm which could be used to calculate goodness of fit would be to record the color data in the form of the membership functions pictured in FIG. 31. Fuzzy matching could then be executed for each component to obtain its goodness of fit, and the three values could be averaged to obtain the goodness of fit of the color. In the example in FIG. 31, the goodness of fit of the R density is 0.8; that of the G density is 1.0; and that of the B density is 0.8. The overall goodness of fit, which we obtain by averaging these values, is 0.87.

Since the pattern described above is composed of a number of marks, the overall goodness of fit of the color can be determined by calculating the goodness of fit of the color of each mark as described above and making appropriate use of the data for all the marks obtained in this way. For example, once the goodness of fit had been found for the color of each mark, we could execute any of a variety of calculations and statistical operations, such as obtaining the average value of the goodnesses of fit or their distribution. Or instead of obtaining the goodness of fit of the color after that of the marks, we could obtain the goodness of fit of each of the R, G and B components of all the marks (as an average, say). By finally averaging these three values, we could obtain the overall goodness of fit of the color.

Based on the goodnesses of fit of the shape and color which it receives, the copy machine makes an overall judgment as to whether the document is non-reproducible. It would, of course, also be possible for the image processing device to handle this overall judgment. With this configuration, even if the goodness of fit of the color or the shape of the pattern is reduced by tampering, the recognition rate will not be affected.

FIG. 32 shows an image processing device which is our third ideal embodiment of this invention. This embodiment differs from the two described above in that the judgment processing is based on a single color component signal. Image processing device 10" lacks the mark color extraction unit 13*b* and the AND element 13*c* which are components of binary processing unit 13 in image processing device 10, the first embodiment; its unit 13 consists only of mark shape extraction unit 13*a*. Since the rest of the configuration of device 10" is basically identical to that of the previous embodiments (except for the fact that its image input unit 12 processes only one signal), the components have been given the same numbers and are not discussed here.

In this embodiment, if yellow is chosen for the marks, the B signal will be input into image input unit 12 if the format is RGB; the Y signal will be input if the format is YMC; and the b signal will be input if the format is Lab.

Image input unit 12 transmits the single color component signal it receives to binary processing unit 13'. Regardless of whether the signal is B, Y or b, its numerical value will be low. If the reference values in mark shape extraction unit 13*a* are made equally small, processing unit 13*b* will generate a binary image in which all pixels of the target color are "1". This image is transmitted to storage device 14. This device processes the binary image data stored in device 14 just as the first embodiment did and outputs the goodness of fit.

With this configuration, the same image processing device 10" can be used in a variety of copy machines which use different formats for the image data (RGB, YMC or Lab), and it will extract the pattern accurately.

Since only one color component signal is used to make a judgment, the configuration of the circuit is simplified. In copy machines which scan the image multiple times or those in which the data are received in the same order that they are acquired, the color component signal used for the judgment can be acquired first and sent to processing device 10". This will allow the subsequent judgment of whether the data contain the specified pattern to be made relatively quickly (before the image is completed). The copy processing can be halted before the image is completed, eliminating the possibility that a completed image will be erroneously output.

Figure 33:
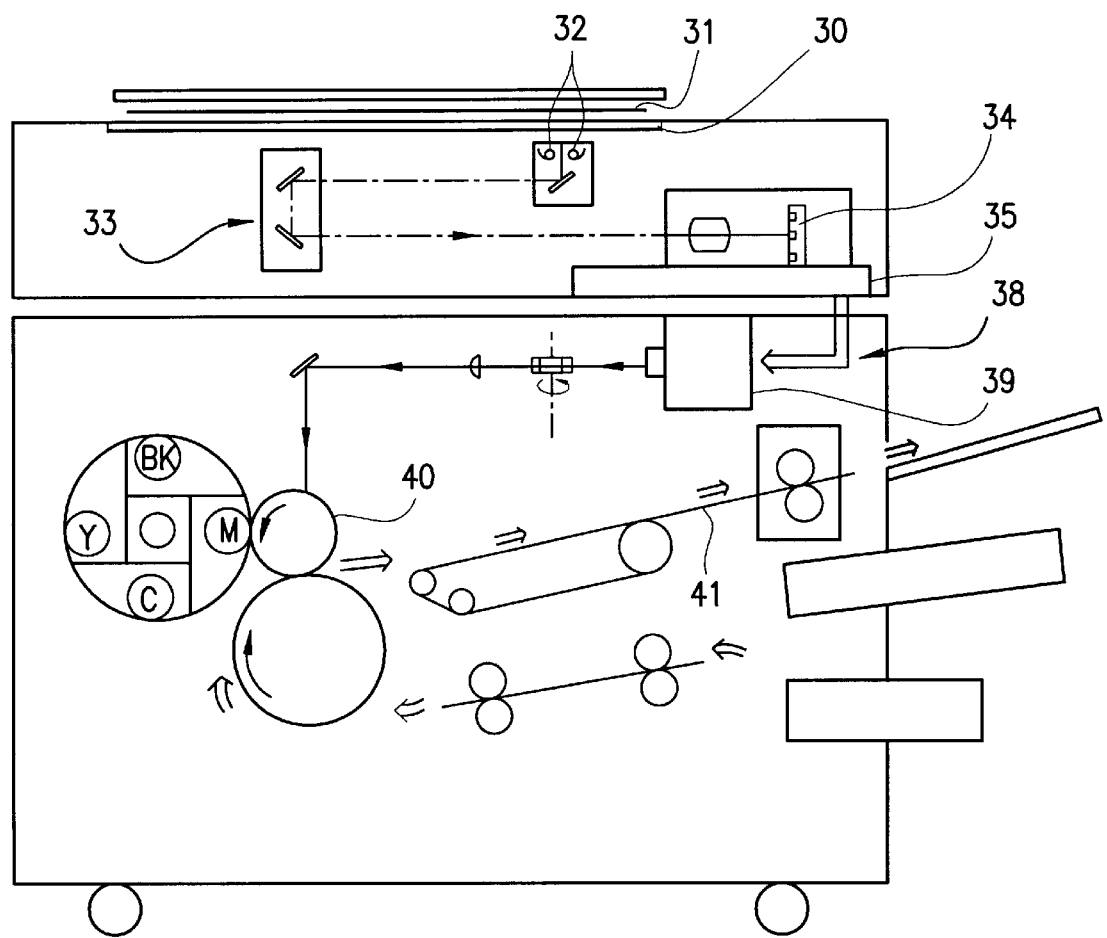
FIG. 33 shows an example of a copy machine designed according to this invention.
Figure 34:
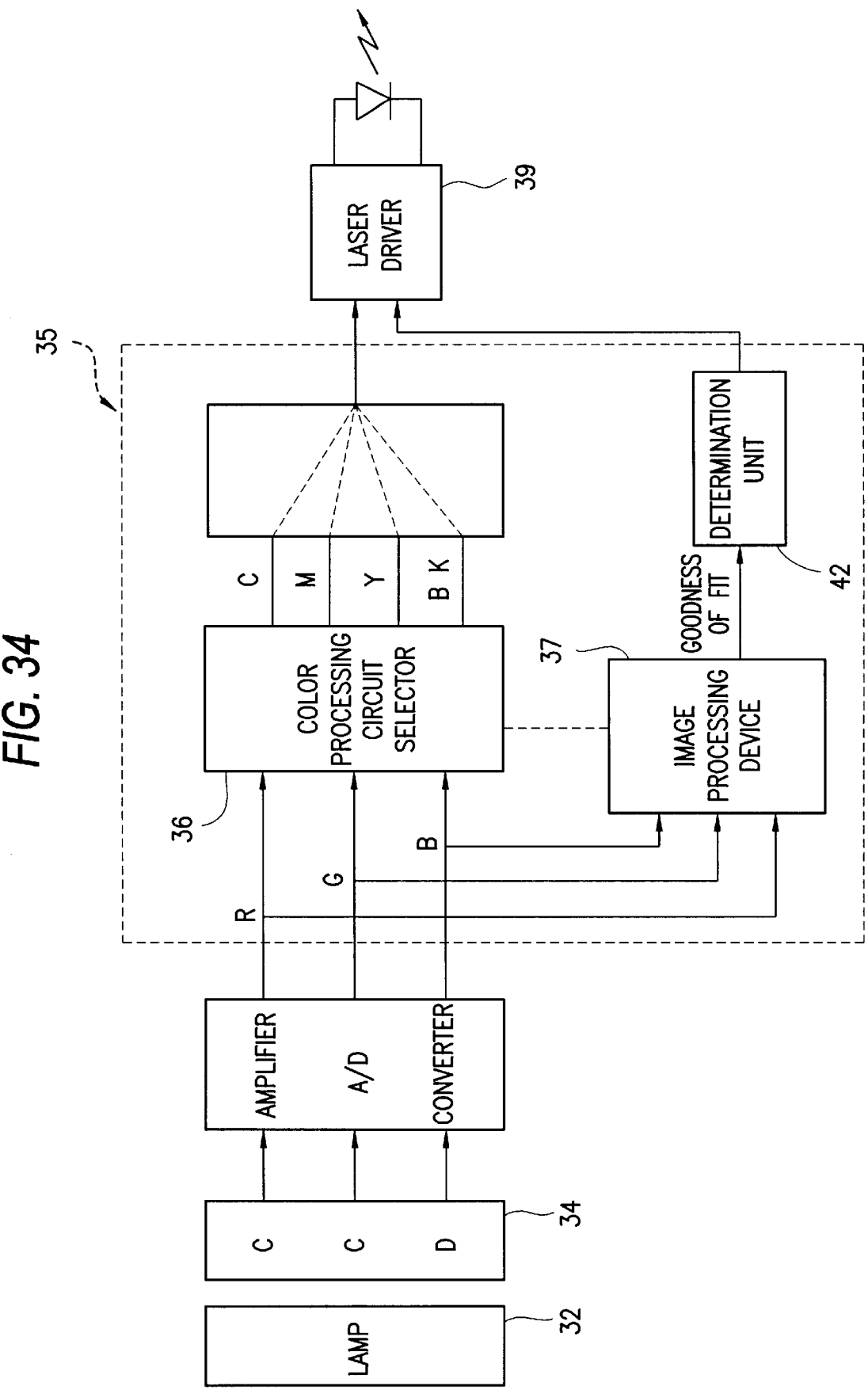
FIG. 34 shows an example of a copy machine designed according to this invention.

FIGS. 33 and 34 show an example of a device as described above which has been installed in a copy machine. As shown in the drawing, the light emitted by lamp 32 is reflected by document 31, which is loaded on glass 30. The reflected light passes through optical system 33 and enters CCD 34, which is an image sensor. Here the image on the document is read. Lamp 32, as well as the flat mirror and other components which comprise optical system 33, moves at a specified speed as it scans the document. Line by line, CCD 34 reads the specified portion of document 31, and it transmits the image data (R/G/B) to signal processing unit 35.

Signal processing unit 35, which is pictured in FIG. 34, has an ordinary color processing circuit 36 and device 37, which is the image processing device discussed above as a feature of this invention. The aforesaid image data are transmitted in parallel to color processing circuit 36 and to image processing device 37. If device 37 is realized as the third ideal embodiment, either one of the RGB signals or a specified output signal from color processing circuit 36 (for example, the Y signal) can be input.

Color processing circuit 36 analyzes the colors into their various components, magenta (M), cyan (C), yellow (Y) and black (Bk), and outputs these data to printing device 38. The image is actually scanned four times. One of the aforesaid four components (M, C, Y, or Bk) resulting from the first scan is output to laser driver 39, which is located on the input side of printing device 38. This causes a laser beam to be projected onto a specified location on light-sensitive drum 40. When the fourth scan has been completed, the copying operation is executed on the copy paper, and the finished copy 41 is output. Since the actual mechanism which executes the copying operation is identical to that of existing copiers, we shall omit an explanation of its action.

While the aforesaid image processing circuit 36 is processing the signals and in parallel with this processing, image processing device 37 processes the RGB signals which it receives (or one of them) to obtain the goodness of fit of the shape (the first and third embodiments) or of both the shape and the color (second embodiment). The goodness of fit which is obtained is transmitted to determination unit 42 in the PPC.

Based on the goodness of fit which it receives, determination unit 42 determines whether the specified pattern has been found on the document being processed. If the goodness of fit is high, unit 42 concludes that this is a non-reproducible document on which the specified pattern is printed. It then generates a control signal to halt the output of the aforesaid laser driver 39 or transmits a control signal to color processing circuit 36 to cause it to execute its various routines for situations when copying is prohibited, such as making the entire screen go black.

If image processing device 37 did not output goodness of fit, but instead makes the determination itself, the aforesaid determination unit 42 would be unnecessary. The output of image processing device 37 (a signal indicating that the specified pattern has been detected) could be transmitted to laser driver 39 or image processing circuit 36.

In the embodiments discussed above, the device is installed in a copy machine; however, this invention is not limited to this application, but could be applied as well in a color scanner, a color printer, a fax machine, a device to transmit communications, or a variety of other devices.

Figure 35:
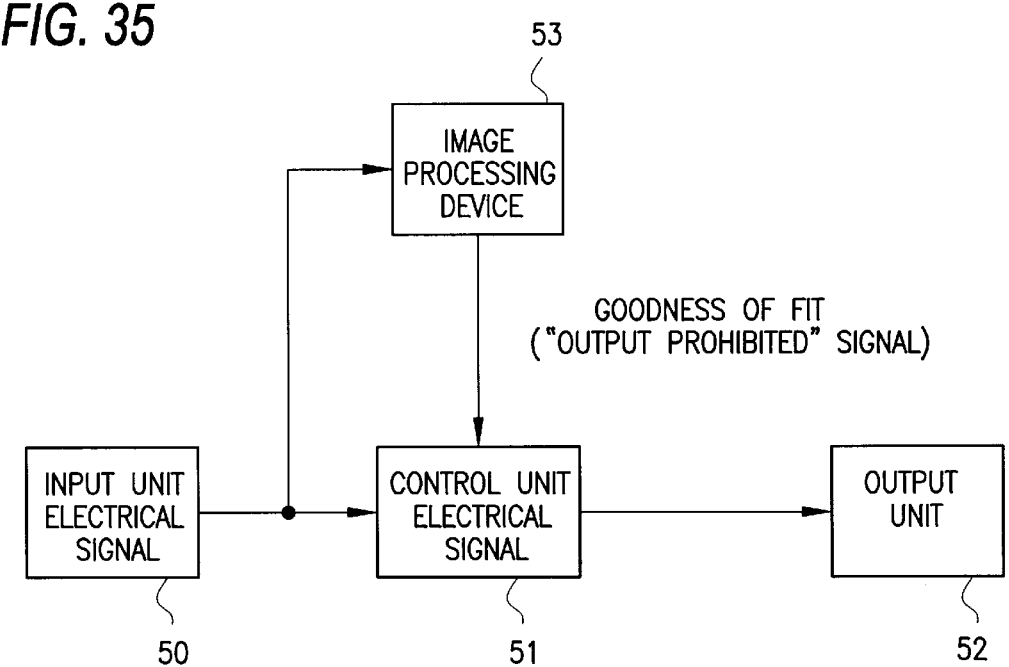
FIG. 35 shows an example of a scanner designed according to this invention.

To give an example, a scanner employing this invention might have the configuration pictured in FIG. 35. The scanner comprises three main components: input unit 50, control unit 51 and output unit 52. Input unit 50 scans document using light from a light source. The light reflected (or transmitted) by the document is detected by a photoelectric converter element such as a CCD, a photomultiplier, or a photodiode. This light is converted to an electrical signal which is transmitted to control unit 51. Control unit 51 amplifies the electrical signal from the input unit and executes various kinds of image processing, such as the correction of specified tones or contour enhancement, and transmits the corrected signal to output unit 52.

Output unit 52 transforms the data as needed, based on the signal it has received from control unit 51, and outputs them to the specified output device. When the scanner and printer are separate devices and the scanner does no more than read the document, the data will need to be sent from scanner to printer. It will thus be necessary that the image data which the scanner has read be stored temporarily in a memory device (an output device). Whatever processing is required to write the data will be executed.

If the output device is a printer or the like (which is installed in the same device), the signal must be converted from an electrical to an optical signal, and the processing must be executed to convert the signal in order to write the data on a paper medium (a photosensitive material). Since commonly available devices may be used as the actual components, we shall omit a detailed discussion of them here.

With this invention, an image processing device 53 is provided. The signals representing the image data which are received from the said input unit 50 are input into image processing device 53 as well as into control unit 51. Image processing device 53 can employ any of the processors in the embodiments discussed above which obtain the goodness of fit with respect to the specified pattern.

Image processing device 53 executes the specified processing on the image data which it receives. It obtains the goodness of fit, which is then used to detect the specified pattern. Device 53 sends the goodness of fit (or a "prohibit output" signal) to control unit 51. Based on this goodness of fit, control unit 51 makes the final judgment as to whether the specified pattern has been found. If it concludes that the pattern has been found, it halts the signal output to output unit 52. A "prohibit output" signal could also be sent to input unit 50 or output unit 52.

If in this embodiment image processing device 53 makes the final judgment as to whether the specified pattern has been found and concludes that the pattern has been detected, it can output a "prohibit output" signal itself. In this case, control unit 51 will respond to this signal by executing the aforesaid specified processing to interrupt the copying or printing process.

Figure 36:
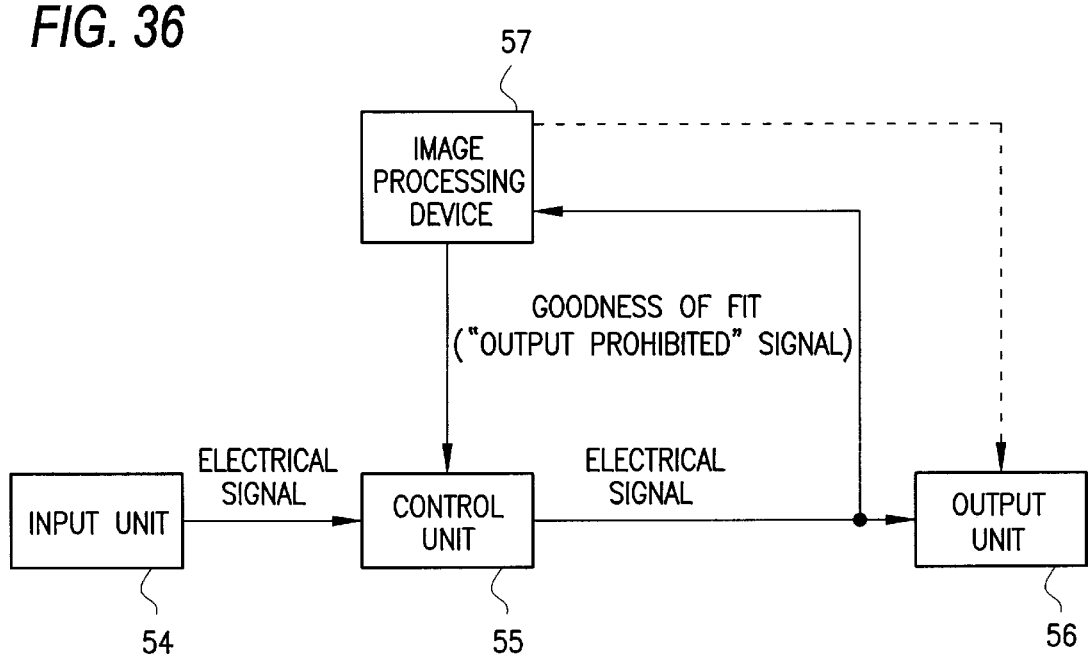
FIG. 36 shows an example of a printer designed according to this invention.
Figure 37:
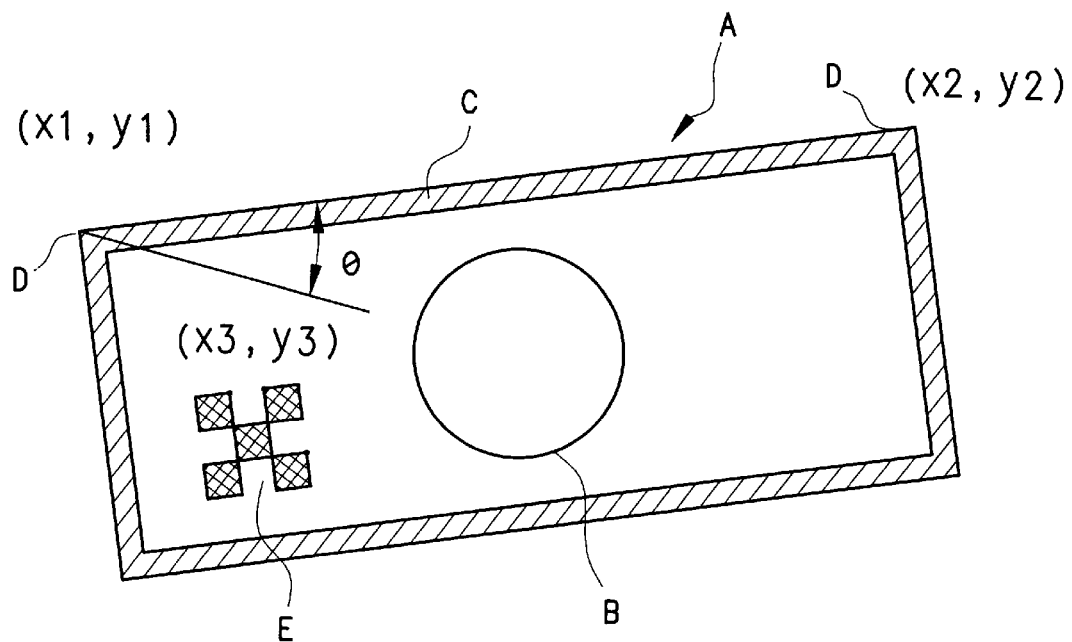
FIG. 37 illustrates the operation of an image processing device belonging to the prior art.
Figure 38A:
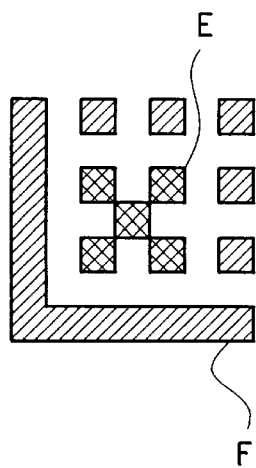
FIGS. 38(A)–38(B) shows two attempts to address the problem in the prior art.
Figure 38B:
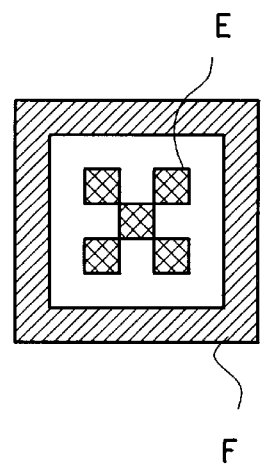

FIG. 36 shows how this signal processing device could be used in a printer. The image data (in the form of electrical signals) are sent to input unit 54 either directly from the scanner or through a medium such as a storage device. Control unit 55 executes the processing necessary to convert the image (i.e., it converts the data to the form required by the output mechanism). Output unit 56 executes the processing required to convert the signal from electrical to optical, and the image data are reproduced on a photosensitive material.

If the scanner described above does not have an image processing device 53 with a means to halt its operation when a specified pattern has been detected, the image data will be read even if the document is one which should not be read.

The output signal from control unit 55 is sent to image processing device 57 (identical to the aforesaid image processing device 53), which executes the specified image processing, obtains the goodness of fit indicating the degree of resemblance to the specified pattern, and executes processing to detect the pattern. If the method entails using the goodness of fit, this value is transmitted to control unit 55. Unit 55 uses the goodness of fit to make the final determination as to whether the specified pattern has been found. If it determines that it has, it halts data output to output unit 56. An "operation prohibited" signal could also be sent directly to output unit 56 to cause that unit to halt its operation.

If in this embodiment image processing device 57 makes the final judgment as to whether the specified pattern has been found and the pattern has been detected, it can output an "operation prohibited" signal to control unit 55. This will halt data output from control unit 55 to output unit 56. Alternatively, it can send an "operation prohibited" signal directly to output unit 56 to halt its operation.

This invention has the following effects. As stated above, the image processing device and method of this invention generate a binary image in which the marks on a document are made to stand out from their background. It generates this image by executing threshold processing on a single color component signal. Once the pattern has been generated, the pattern can be extracted. The processing is executed by a comparator consisting of a specified number of bits. This allows the binary circuit to be simplified and reduces the size and cost of the system.

The marks are detected by extracting only a specified color. If the marks of the pattern are printed along with other marks with a low density of the chosen color, executing threshold processing on a single color component signal will point up only the marks in the pattern so that they can be detected. The recognition rate will not be affected by the presence of extraneous marks of another color. An uninformed person will not know which of the different colored marks form the pattern, and it will be more difficult to tamper with the document.

If the color component signals are transmitted in the order of their surfaces, the signal which is transmitted first can be selected to be used for pattern recognition. This will allow pattern recognition to be completed before the entire image has been transmitted. The generation of the image can be interrupted at that point, and erroneous operation can be minimized.

With one configuration described, the goodness of fit of the shape and that of the color are obtained separately, so the recognition rate will remain high even when the shape of the marks or their color has been altered. In actual situations, it frequently happens that the color of some of the marks varies as a result of a printing error or dirt on the document. As can be seen in the embodiments, density data can also be used when the image is binarized to make the marks discernable. To allow for some color variation of the type mentioned, the threshold value must be set low to allow a range of colors to pass. The threshold value used to extract a single color signal must also be set low. In this case it is possible that false positives will be identified when the marks are all of different colors. However, if we make the threshold for the goodness of fit of the color very strict but also make a cumulative judgment based on the colors of all the marks, we will be able to distinguish accurately between printing errors and marks which are actually of different colors. This will enhance the recognition rate.

Using yellow as the color for the marks allows pattern recognition to be executed in any image format, whether RGB, Lab or YMC. This allows the device to be used in any type of copy machine. It also makes it more difficult to tamper with the pattern, as yellow is difficult for the human eye to discriminate.

With the other configurations described, the specified pattern consists of a number of marks placed along the outlines of several shapes. Thus there is no need to use a particular shape for the area to be extracted, and it will be more difficult for someone to discern that there is a pattern. The pattern will not need to be scanned separately to extract the marks, and both the marks and the pattern they form can be extracted on a single scan.

An uninformed person will not know which portion of the marks constitutes the pattern, and so will find it more difficult to alter or deface it. Even if the document is defaced, it is unlikely that the portion defaced will be the specified pattern, so the recognition rate will not be affected. The marks are expressed only as their coordinates, so no feature analysis is required. Very small marks can be used, which will make it difficult for a person even to notice that the marks are there. This will also make it more difficult to tamper with the pattern. Making the marks smaller allows them to be found faster. It also allows us to use a smaller and less costly detection circuit.

The marks are placed along the outline of a shape or shapes. Identical marks in other locations will not be used to detect the pattern. This allows us to use marks which are not on the outline of the shape as a dummy pattern to further reduce the likelihood of tampering.

When such an image processing device is installed in a copy machine, scanner or printer, it will reliably prevent the output of copies of documents which may not legally be copied, such as bank notes or negotiable securities. (The copying process itself will not be executed, or an image which is different from the original non-reproducible document will be copied and output.) It will also halt the reading or printing of the document.

What is claimed is:

1. An image processing method to detect a particular mark having a particular shape and a particular color in a received image data, comprising:

obtaining a first image data by executing threshold processing on a particular single color component signal out of a plurality of color component signals forming said particular mark, said particular single color component signal being predetermined such that said particular single color component signal presents a larger contrast with a background color of said particular mark than a contrast of other color components of said plurality of color component signals with said background color, said first image data representing a particular shape of said mark;

obtaining a second image data representing a color density of at least one other color component signal forming said particular mark, said color density being within a given range so as to represent a particular color of said particular mark; and performing a logical AND operation on said first and second image data for detecting said particular mark which has said particular shape and color.

2. The image processing method according to claim 1, wherein said step of obtaining a second image data further comprises using every other color component signal of said received image data whose color component density is within a given range.

3. An image processing method to detect a particular mark having a particular shape and a particular color in a received image data, comprising:

obtaining a first image data by executing threshold processing on a particular single color component signal out of a plurality of color component signals forming said particular mark, said particular single color component signal being predetermined such that said particular single color component signal presents a larger contrast with a background color of said particular mark than a contrast of other color components of said plurality of color component signals with said background color, said first image data representing a particular shape of said mark;

obtaining a second image data representing a color density of at least one other color component signal forming said particular mark, said color density being within a given range so as to represent a particular color of said particular mark;

performing a logical AND operation on said first and second image data for detecting said particular mark which has said particular shape and color;

obtaining every color density of all color components of said particular mark;

calculating every goodness of fit between said color density of all color components and given reference color components;

calculating a goodness of fit between said shape of said particular mark and a given reference; and outputting said every goodness of fit for said color density, and said goodness of fit for said shape of said particular mark either separately or in combination.

4. The image processing method according to claim 1 or 3, wherein said particular color is yellow.

5. An image processing method to detect a particular pattern constituted by a plurality of particular marks of a particular shape and a particular color in a received image data, comprising:

obtaining a first image data by executing threshold processing on a particular single color component signal out of a plurality of color component signals forming said particular marks, said particular single color component signal being predetermined such that said particular single color component signal presents a larger contrast with a background color of said particular marks than a contrast of other color components with said background, said first image data representing a particular shape of said particular marks;

obtaining a second image data representing a color density of at least one other color component signal forming said particular marks, said color density being within a given range so as to represent a particular color of said particular marks;

performing a logical AND operation on said first and second image data for detecting said particular marks which have said particular shape and color; and matching a particular pattern formed by said plurality of detected particular marks against a given reference pattern.

6. The image processing method according to claim 5, wherein after said plurality of particular marks are detected in said received image data, said method further comprises the steps of:

obtaining every color density of all color components of said plurality of particular marks;

calculating every goodness of fit between said color density of all color components and given reference color components;

matching a particular pattern formed by said plurality of detected particular marks against a given reference pattern; and outputting said every goodness of fit for said color density.

7. The image processing method according to claim 5, wherein said plurality of particular marks of said particular shape are detected based on both said threshold processed particular single color component and a density data from every other color component signal of said received image data whose color component density is within a given range.

8. The image processing method according to claim 5 or 6, wherein said particular color is yellow.

9. An image processing device to detect a particular mark of a particular shape and color in a received image data, comprising:

a binary processing unit comprising:
a mark shape extracting unit to execute threshold processing on a specific color component signal out of a plurality of color component signals constituting said received image data, said specific color component signal being predetermined such that said single color component signal presents a higher contrast with a background color of said particular mark than a contrast of other color components of said plurality of color component signals with said background color;

a mark color extraction unit to detect if at least one color density of said color component signals other than said specific color component signal used in said mark shape extracting unit is within a given range; and an AND element receiving an output of said mark shape extraction unit and said mark color extraction unit;

a first memory unit to store a binary image output from said binary processing unit; and a mark location detecting unit to read out said binary image from said first memory unit and match said binary image with said particular mark.

10. The image processing device according to claim 9, further comprising:

a second memory unit to store a mark location data output from said mark location detecting unit; and a pattern matching unit to match said mark location data against a specific reference pattern consisting of said particular marks.

11. The image processing device according to claim 9, further comprising:

a third memory unit parallel to said binary processing unit to store said received image data; and a calculating means to calculate a goodness of fit of said specific color component based on a density data of said specific color component of said detected particular mark whose location is output from said mark location detecting unit.

12. A copy machine having a reading unit to read an original document to generate an image data, a color processing unit to convert said image data of said reading unit, a printing unit to print an image output from said color processing unit, and an image processing device to detect a particular mark of a given shape and color in a received image data of a color image, said image processing device comprising:
a binary processing unit comprising:
a mark shape extracting unit to execute threshold processing on a specific color component signal out of a plurality of color component signals constituting said received image data, said specific color component signal being predetermined such that said single color component signal presents a higher contrast with a background color of said particular mark than a contrast of other color components of said plurality of color component signals with said background color;

a mark color extraction unit to detect if at least one color density of said color component signals other than said specific color component signal used in said mark shape extracting unit is within a given range; and an AND element receiving an output of said mark shape extraction unit and said mark color extraction unit;

a first memory unit to store a binary image output from said binary processing unit; and a mark location detecting unit to read out said binary image from said first memory unit and match said binary image with said particular mark.

13. The copy machine according to claim 12, further comprising:

a second memory unit to store a mark location data output from said mark location detecting unit; and a pattern matching unit to match said mark location data against a specific reference pattern consisting of said particular marks.

14. The copy machine according to claim 12, further comprising:

a third memory unit parallel to said binary processing unit to store said received image data; and a calculating means to calculate a goodness of fit of said color component based on a density data of said specific color component of said detected particular mark whose location is output from said mark location detecting unit.

15. A scanner device having a reading unit to read an original document to generate an image data, a control unit to process said image data connected to said reading unit, an output unit to output said processed image data to an output device connected to said scanner, and
- an image processing device to detect a particular mark of a given shape and color in a received image data of a color image, said image processing device comprising:
  - a binary processing unit comprising:
    - a mark shape extracting unit to execute threshold processing on a specific color component signal out of a plurality of color component signals constituting said received image data, said specific color component signal being predetermined such that said single color component signal presents a higher contrast with a background color of said particular mark than a contrast of other color components of said plurality of color component signals with said background color;
    - a mark color extraction unit to detect if at least one color density of said color component signals other than said specific color component signal used in said mark shape extracting unit is within a given range; and
    - an AND element receiving an output of said mark shape extraction unit and said mark color extraction unit;
  - a first memory unit to store a binary image output from said binary processing unit; and
  - a mark location detecting unit to read out said binary image from said first memory unit and match said binary image with said particular mark.

16. The scanner device according to claim 15, further comprising:
- a second memory unit to store a mark location data output from said mark location detecting unit; and
- a pattern matching unit to match said mark location data against a specific reference pattern consisting of said particular marks.

17. The scanner device according to claim 15, further comprising:
- a third memory unit parallel to said binary processing unit to store said received image data; and
- a calculating means to calculate a goodness of fit of said color component based on a density data of said specific color component of said detected particular mark whose location is output from said mark location detecting unit.

18. A printer having a control unit to process an input image data, a printing unit to print said processed image data, and
- an image processing device to detect a particular mark of a given shape and color in a received image data of a color image, said image processing device comprising:
  - a binary processing unit comprising:
    - a mark shape extracting unit to execute threshold processing on a specific color component signal out of a plurality of color component signals constituting said received image data, said specific color component signal being predetermined such that said single color component signal presents a higher contrast with a background color of said particular mark than a contrast of other color components of said plurality of color component signals with said background color;
    - a mark color extraction unit to detect if at least one color density of said color component signals other than said specific color component signal used in said mark shape extracting unit is within a given range; and
    - an AND element receiving an output of said mark shape extraction unit and said mark color extraction unit;
  - a first memory unit to store a binary image output from said binary processing unit; and
  - a mark location detecting unit to read out said binary image from said first memory unit and match said binary image with said particular mark.

19. The printer according to claim 18, further comprising:
- a second memory unit to store a mark location data output from said mark location detecting unit; and
- a pattern matching unit to match said mark location data against a specific reference pattern consisting of said particular marks.

20. The printer according to claim 18, further comprising:
- a third memory unit parallel to said binary processing unit to store said received image data; and
- a calculating means to calculate a goodness of fit of said color component based on a density data of said specific color component of said detected particular mark whose location is output from said mark location detecting unit.

* * * * *